US010825308B2

(12) United States Patent
Clauser et al.

(10) Patent No.: US 10,825,308 B2
(45) Date of Patent: Nov. 3, 2020

(54) CASHIER ASSIST AUTOMATED PAYMENT SYSTEM

(71) Applicant: Crane Payment Innovations, Inc., Malvern, PA (US)

(72) Inventors: Robert Clauser, Columbus, NJ (US); Ryan Harding Bimes, Philadelphia, PA (US); Christopher Robert Marks, Philadelphia, PA (US); Robert James Blythin, Ardmore, PA (US); Matthew Scott Peterson, Wynnewood, PA (US)

(73) Assignee: Crane Payment Innovations, Inc., Malvern, PA (US)

( * ) Notice: Subject to any disclaimer, the term of this patent is extended or adjusted under 35 U.S.C. 154(b) by 0 days.

(21) Appl. No.: 16/297,373

(22) Filed: Mar. 8, 2019

(65) Prior Publication Data

US 2019/0325711 A1    Oct. 24, 2019

Related U.S. Application Data

(60) Provisional application No. 62/660,691, filed on Apr. 20, 2018.

(51) Int. Cl.
*G07G 1/00* (2006.01)
*G07G 1/12* (2006.01)
*G06F 13/42* (2006.01)

(52) U.S. Cl.
CPC ....... *G07G 1/0018* (2013.01); *G06F 13/4282* (2013.01); *G07G 1/12* (2013.01); *G06F 2213/0042* (2013.01)

(58) Field of Classification Search
CPC .... G07G 1/0018; G07G 1/12; G06F 13/4282; G06F 2213/0042
See application file for complete search history.

(56) References Cited

U.S. PATENT DOCUMENTS 4,497,261 A * 2/1985 Ferris ................... G07F 19/205
  109/2
4,884,514 A * 12/1989 Shockey ................ G07F 19/20
  109/24.1

(Continued)

FOREIGN PATENT DOCUMENTS

| EP | 1522980 A1 * | 6/2004 | ............. G07F 19/00 |
| WO | 2010056617 A1 | 5/2010 | |

OTHER PUBLICATIONS

NCR Cororation, "NCR FastLane SelfServ Checkout Release 6," YouTube video, Feb. 19, 2016, 1 page. https://www.youtube.com/watch?v=SgnzxcptEsw.

*Primary Examiner* — Thien M Le
*Assistant Examiner* — Asifa Habib

(57) ABSTRACT

An automated payment system is disclosed. The automated payment system comprises a housing, a door coupled to the housing, wherein the door covers a side of the housing when in a closed position, a payment apparatus within an interior of the housing, the payment apparatus fixedly coupled to an extendable base, wherein the extendable base is slidably coupled to the housing and configured to extend out from within the housing and through the side when the door is in an open position, and a handle coupled to the door, the handle operable, when the door is in the open position, to contact the ground to provide additional support for the weight of the payment apparatus.

20 Claims, 29 Drawing Sheets

(56) References Cited

U.S. PATENT DOCUMENTS

| | | | | |
|---|---|---|---|---|
| 6,082,616 | A * | 7/2000 | Lewis | G07F 19/205 |
| | | | | 235/379 |
| 6,293,540 | B1 * | 9/2001 | Kovacs | B65H 1/266 |
| | | | | 271/162 |
| 6,595,606 | B1 * | 7/2003 | Gunst | G07F 19/20 |
| | | | | 109/24.1 |
| 6,739,564 | B2 * | 5/2004 | Maggi | G07F 19/205 |
| | | | | 248/349.1 |
| 6,871,602 | B2 * | 3/2005 | McCracken | E05B 65/0075 |
| | | | | 109/24.1 |
| 2003/0000957 | A1 * | 1/2003 | Brexel | G07D 11/26 |
| | | | | 221/129 |
| 2004/0222286 | A1 * | 11/2004 | Douglass | G07F 19/207 |
| | | | | 235/381 |
| 2007/0199796 | A1 | 8/2007 | Gunst et al. | |
| 2013/0063008 | A1 * | 3/2013 | Martin | G06K 7/0008 |
| | | | | 312/237 |
| 2013/0233211 | A1 * | 9/2013 | Tavares de Pinho | |
| | | | | G07F 19/205 |
| | | | | 109/51 |
| 2016/0042268 | A1 * | 2/2016 | Puttkammer | H05K 1/0298 |
| | | | | 235/375 |
| 2017/0049295 | A1 * | 2/2017 | Lagness | A47L 15/4261 |
| 2017/0140363 | A1 * | 5/2017 | Hicks | G06Q 20/208 |
| 2018/0211468 | A1 * | 7/2018 | Teshima | B65H 3/52 |
| 2019/0150701 | A1 * | 5/2019 | Chirumbolo | A47L 15/4259 |
| 2019/0223685 | A1 * | 7/2019 | Benton | A47L 15/4265 |

* cited by examiner

CASHIER ASSIST AUTOMATED PAYMENT SYSTEM

CROSS-REFERENCE TO RELATED APPLICATIONS

This application claims priority under 35 U.S.C. § 119(e) to U.S. Provisional Patent Application No. 62/660,691, filed Apr. 20, 2018, entitled "CASHIER ASSIST AUTOMATED PAYMENT SYSTEM", which is incorporated herein by reference in its entirety.

TECHNICAL FIELD

This disclosure is generally directed to automated payment systems. More specifically, this disclosure is directed to a cashier assist automated payment system.

SUMMARY

An automated payment system is provided. The automated payment system comprises a housing, a door coupled to the housing, wherein the door covers a side of the housing when in a closed position, a payment apparatus within an interior of the housing, the payment apparatus fixedly coupled to an extendable base, wherein the extendable base is slidably coupled to the housing and configured to extend out from within the housing and through the side when the door is in an open position, and a handle coupled to the door, the handle operable, when the door is in the open position, to contact the ground to provide additional support for the weight of the payment apparatus.

Other technical features may be readily apparent to one skilled in the art from the following figures, descriptions, and claims.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

Before undertaking the DETAILED DESCRIPTION below, it may be advantageous to set forth definitions of certain words and phrases used throughout this patent document. The term "couple" and its derivatives refer to any direct or indirect communication or interaction between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

FIGS. 1A through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged payment system.

As used throughout this specification, the terms currency denomination, denomination of currency, valuable document, currency bill, bill, banknote, note, bank check, paper money, paper currency, coin, coinage, and cash may be used interchangeably herein to refer to a type of a negotiable instrument or any other writing that evidences a right to the payment of a monetary obligation, typically issued by a central banking authority. As used throughout this specification, the term coin can be used interchangeably with token, slug, washer, and object of value (metal, polymer), or a combination thereof, and the like.

Figure 1A:
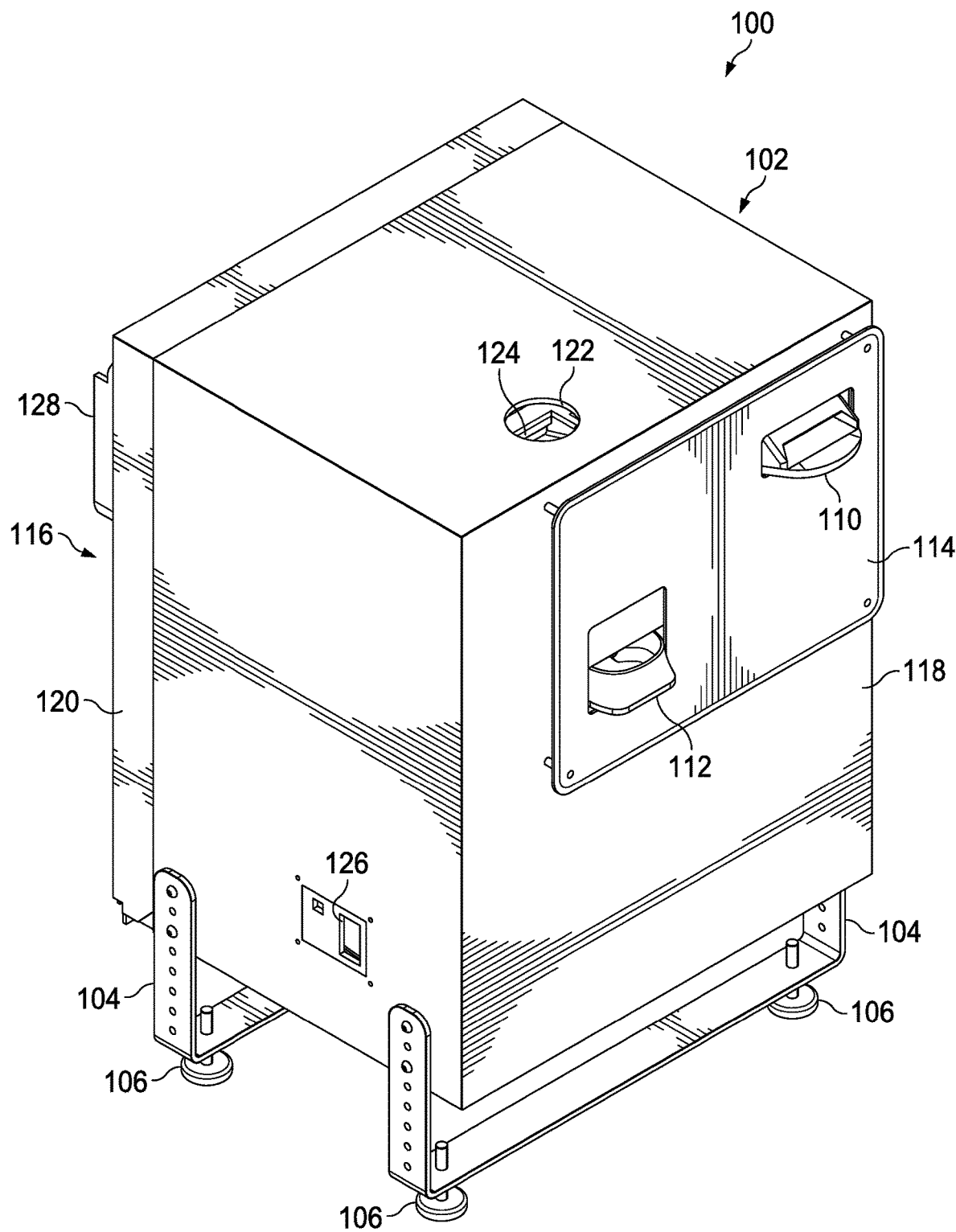
FIG. 1A illustrates a front perspective view of an automated payment system in a closed position in accordance with various embodiments of the present disclosure.
Figure 1B:
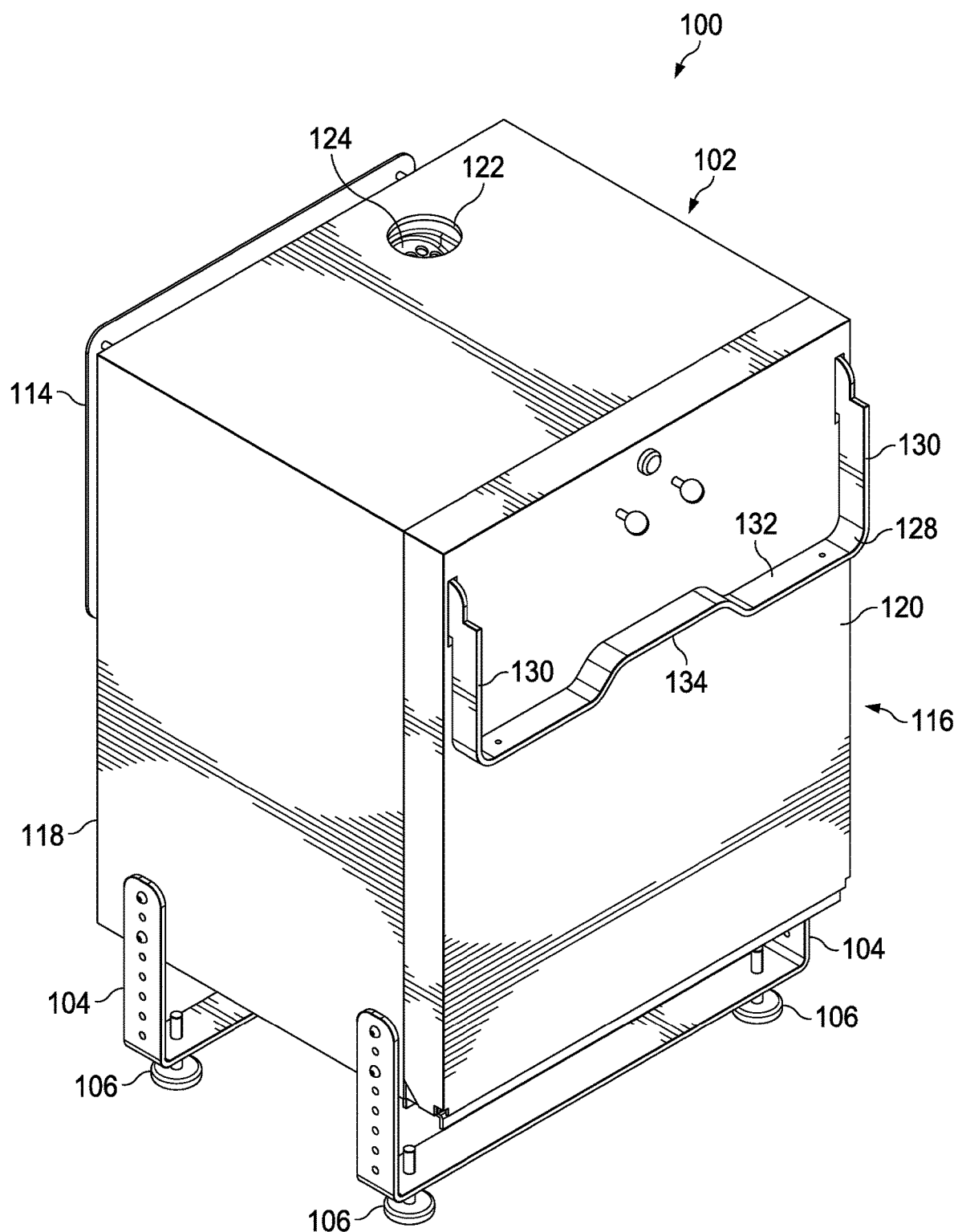
FIG. 1B illustrates a rear perspective view of an automated payment system in a closed position in accordance with various embodiments of the present disclosure.
Figure 1C:
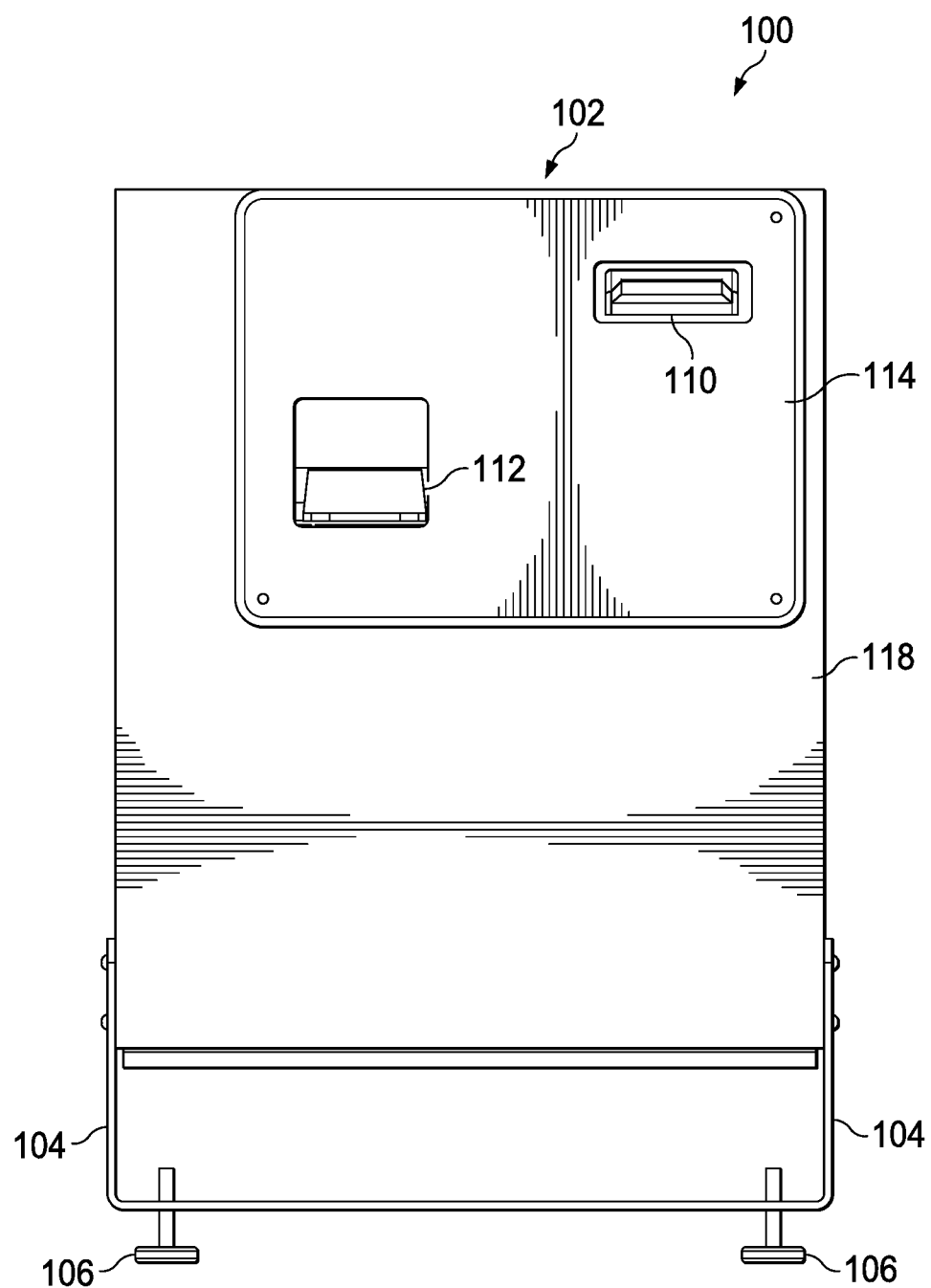
FIG. 1C illustrates a front view of an automated payment system in a closed position in accordance with various embodiments of the present disclosure.
Figure 1D:
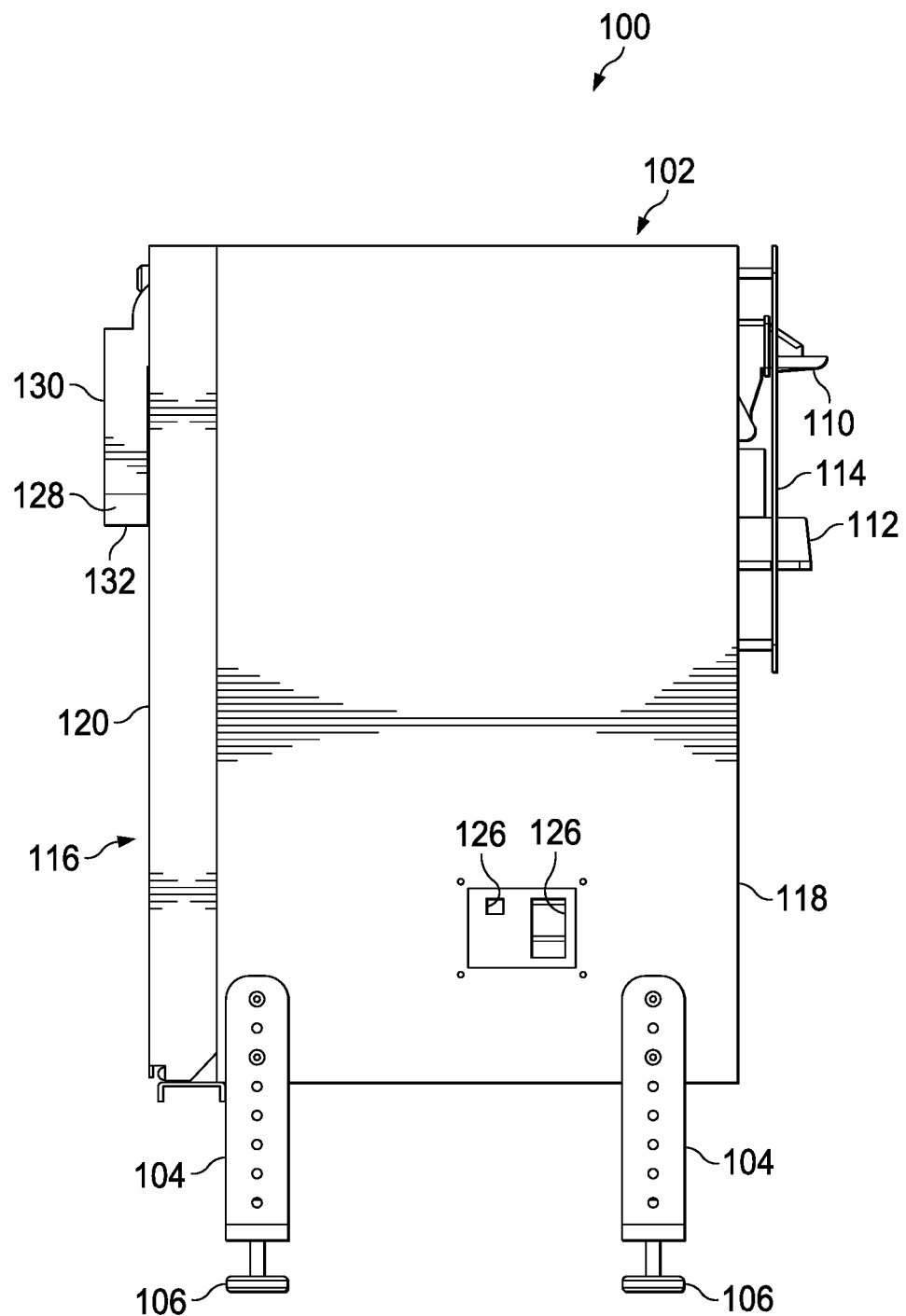
FIG. 1D illustrates a side view of an automated payment system in a closed position in accordance with various embodiments of the present disclosure.
Figure 1E:
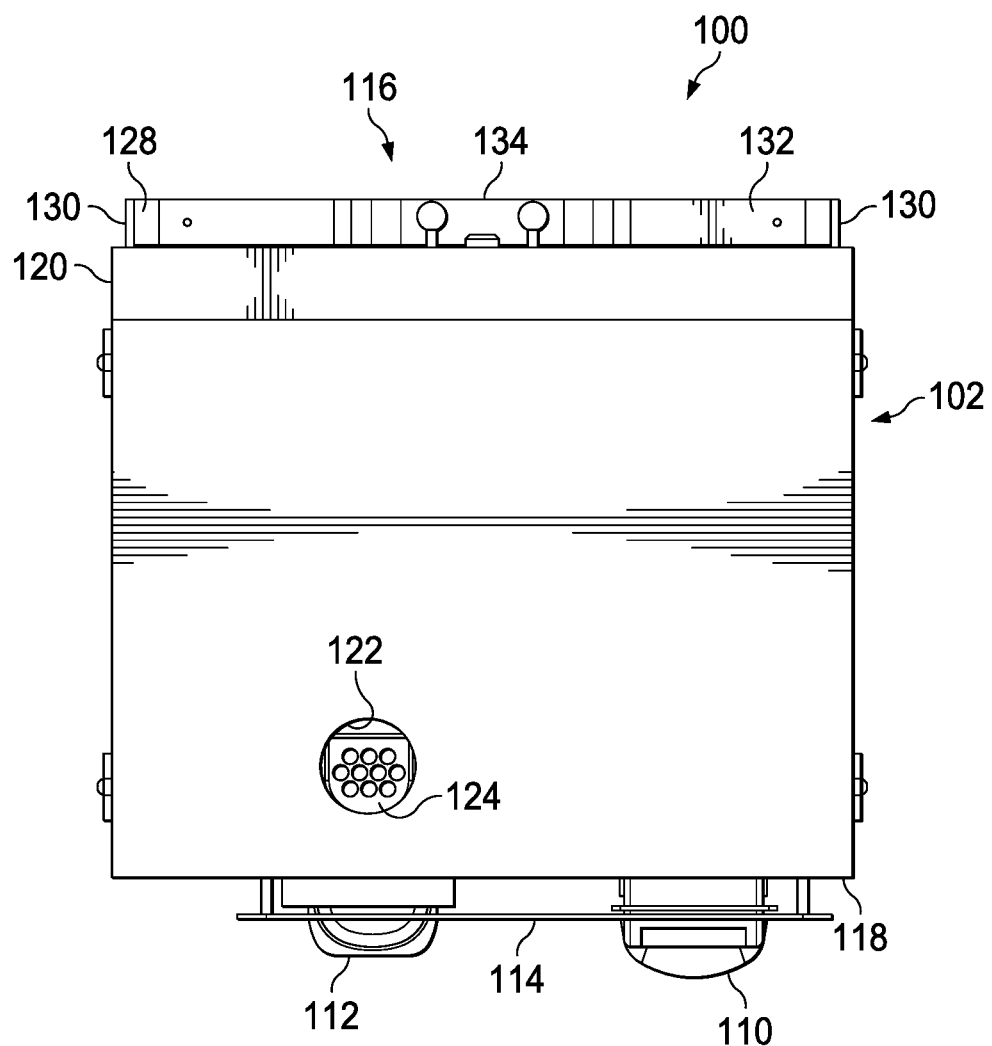
FIG. 1E illustrates a top view of an automated payment system in a closed position in accordance with various embodiments of the present disclosure.

FIGS. 1A-1E illustrate various views of an automated payment system 100 in a closed position according to embodiments of this disclosure. FIG. 1A illustrates a front perspective view of the automated payment system 100 in the closed position, FIG. 1B illustrates a rear perspective view of the automated payment system 100 in the closed position, FIG. 1C illustrates a front view of the automated payment system 100 in the closed position, FIG. 1D illustrates a side view of the automated payment system 100 in the closed position, and FIG. 1E illustrates a top view of the automated payment system 100 in the closed position. Automated payment systems come in a wide variety of configurations, and FIGS. 1A-1E do not limit the scope of this disclosure to any particular implementation of an automated payment system.

The automated payment system includes a housing 102 supported by legs 104. The housing 102 can be fully enclosed, having four connected sidewalls and top and bottom walls. The legs can include feet 106 disposed on or extending from within a bottom surface of the legs 104 to provide additional support and additional height, as well as potentially protecting the surface on which the automated payment system sits from being defaced or damaged by the legs 104, which can be made of a metallic material. The legs 104 serve in one aspect to separate the housing from the ground at a height that allows for users to comfortably access the automated payment system 100. A front surface of the housing 102 includes apertures disposed thereon. The apertures allow for currency exchange interfaces of payment apparatuses included within the housing to protrude from the housing so that users can both deposit and receive currency from the payment apparatuses within the housing. For example, as shown in FIGS. 1A-1E, the automated payment system includes two currency exchange interfaces, a banknote deposit and return interface 110, and a coin return interface 112.

In some embodiments, a payment interaction panel 114 is coupled to the housing 102 opposite a first side 116 of the housing 102 on a second side 118 of the housing 102. The first side of the housing includes a door 120. The payment interaction panel 114 is positioned over the area where the apertures and the currency exchange interfaces 110 and 112 are disposed. The payment interaction panel 114 has apertures that also fit over the currency exchange interfaces 110 and 112. A top surface of the housing includes another aperture 122 thereon that is disposed over a currency deposit interface 124 of a coin recycling apparatus within the housing 102, such that coins depositing into the aperture 122 are deposited into the coin recycling apparatus 124 as part of a payment receiving process. The coin return interface 112 is also a part of the coin recycling apparatus, and can provide coins as change during a transaction after receiving coins deposited in the aperture 122 of the top surface of the housing 102, or after banknotes are received via a banknote deposit and return apparatus.

The automated payment system 100 can be installed within a cabinet having a cutout for displaying the payment interaction panel 114, such that users or customers using the automated payment system 100 only see the payment interaction panel 114 and the currency exchange interfaces 110 and 112, rather than the housing 102, which can provide for a more cosmetically appealing appearance to the users. The housing 102 also includes one or more apertures 126 for providing therethrough one or more connections between the payment apparatus and a point-of-sale system. In some embodiments, for example, the aperture 126 is disposed on a third side of the housing between the first side 116 and the second side 118 of the housing 102.

The automated payment system 100 includes the door 120 coupled to the first side 116, or a rear, of the housing via a hinge. The door includes a handle 128 that extends out from the door 120 via side portions 130 and across a width of the door 120 via a crossbar 132, the crossbar 132 connected to one of the side portions 130 at each end of the crossbar 132. In some embodiments, a central portion 134 of the crossbar 132 of the handle 128 is concave or indented in relation to a length of the crossbar 132, to provide a space for taking hold of the handle 128, which allows for a user to more easily grasp the crossbar 132 of the handle 128 when the crossbar 132 is in contact with the ground. The handle 128 is rotatable via hinges coupled between the door and the side portions 130 of the handle. The handle 128 rotates between a first position, wherein the side portions 130 of the handle 128 run parallel to a front surface of the door 120 such that the handle 128 is folded against the door 120, and a second position, wherein the side portions 130 of the handle 128 run perpendicular to the front surface of the door 120 such that the handle 128 is extended out from the front surface of the door 120.

When the handle 128 moves from the second position to the first position, the handle 128 can engage a locking mechanism to lock the door in place. In some embodiments, a key can be inserted into a key slot 135, allowing for levers 137 to be actuated, such as pressing one or more of the levers towards the center of the door 120, sliding within a slot, to disengage the locking mechanism to allow the handle 128 to be rotated from the first position to the second position. When in the second position, the handle 128 can be pulled to open the door 120 in order to access the payment apparatuses included within the housing 102. Opening the door 120 allows for access to the payment apparatus, for maintenance of the payment apparatuses, for retrieval of currency from the payment apparatuses, or other procedures.

Figure 2A:
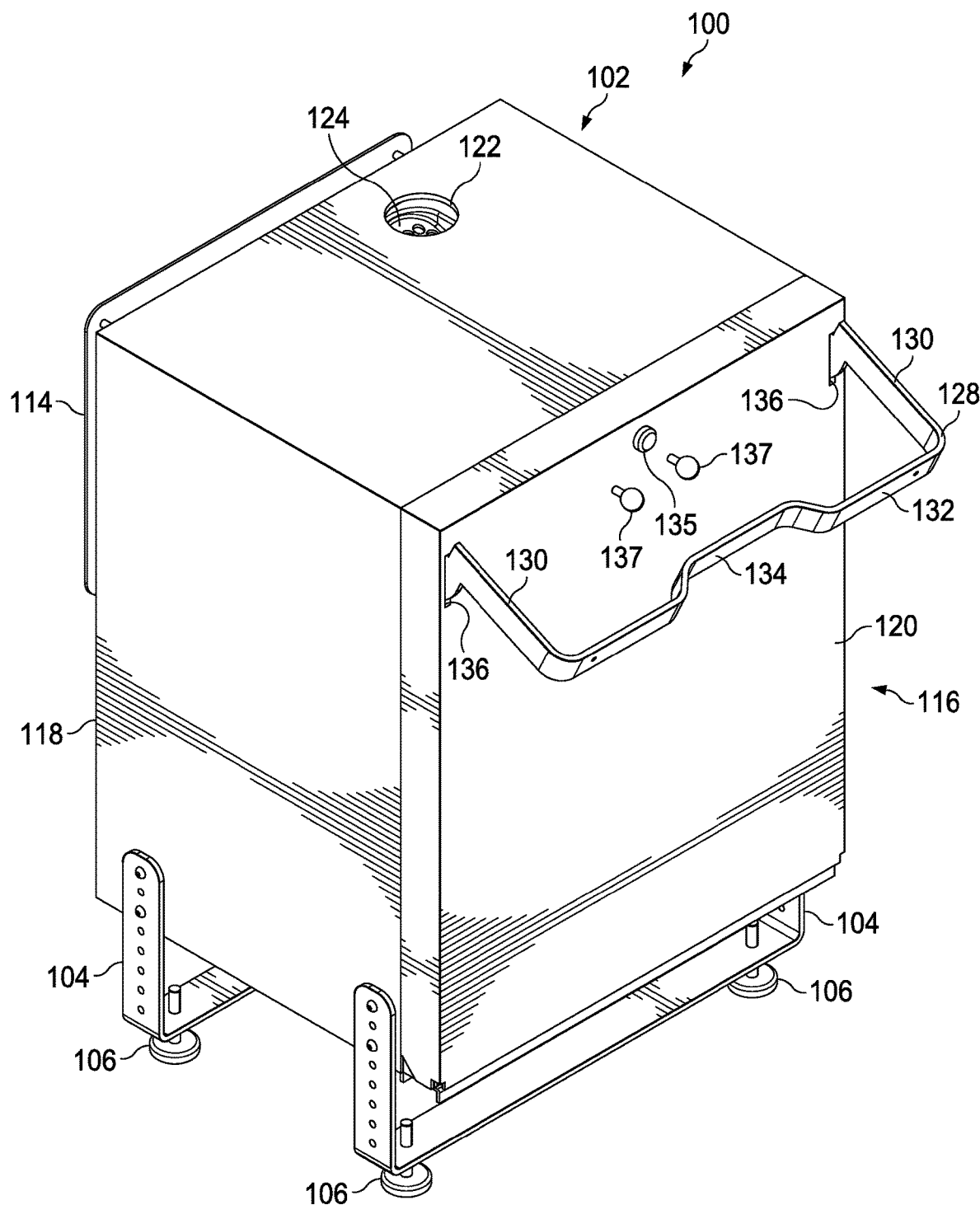
FIG. 2A illustrates a rear perspective view of an automated payment system in a closed position and a handle between a first position and a second position in accordance with various embodiments of the present disclosure.
Figure 2B:
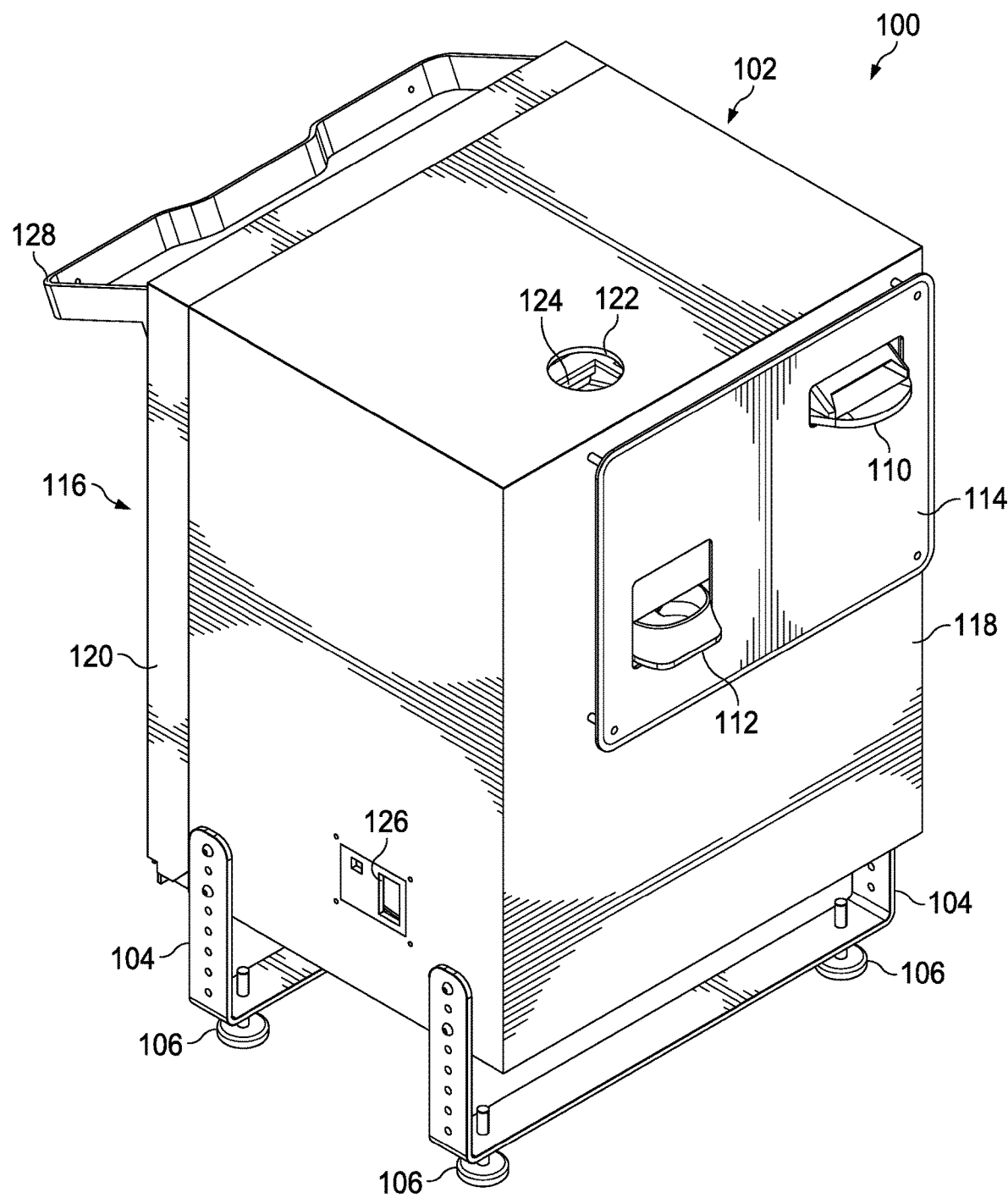
FIG. 2B illustrates a side perspective view of an automated payment system in a closed position and a handle between a first position and a second position in accordance with various embodiments of the present disclosure.
Figure 2C:
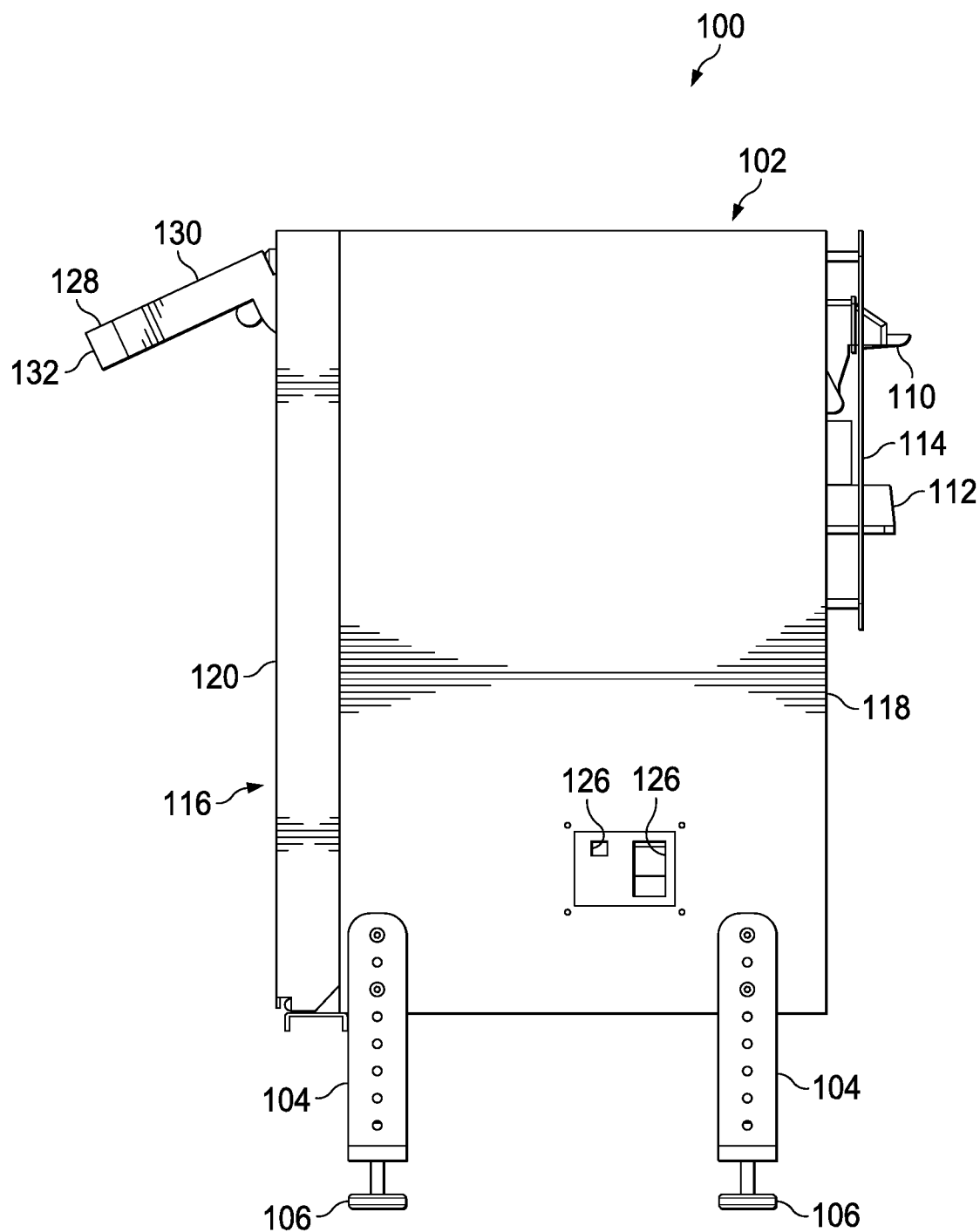
FIG. 2C illustrates a side view of an automated payment system in a closed position and a handle between a first position and a second position in accordance with various embodiments of the present disclosure.
Figure 2D:
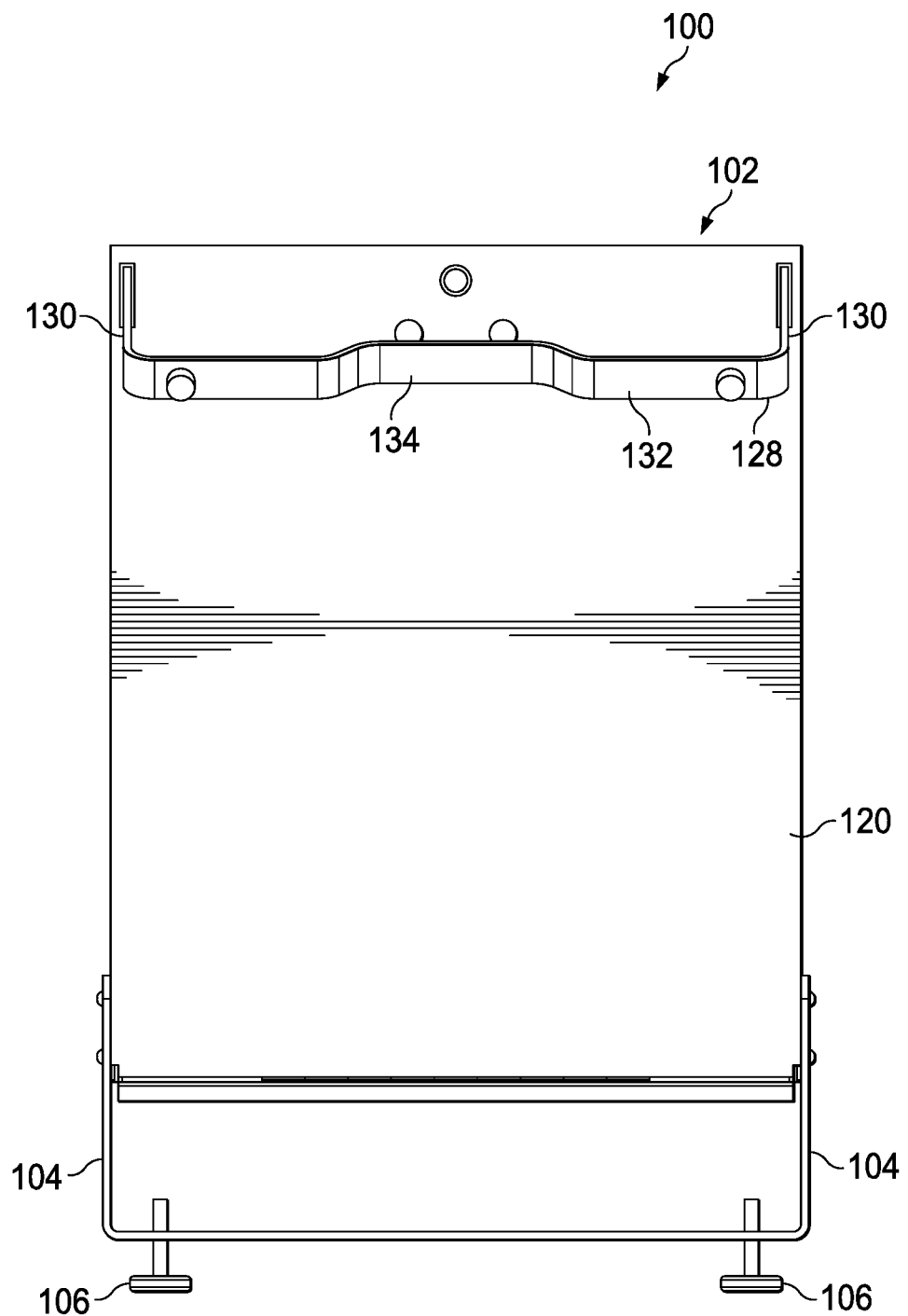
FIG. 2D illustrates a rear view of an automated payment system in a closed position and a handle between a first position and a second position in accordance with various embodiments of the present disclosure.

FIGS. 2A-2D illustrates various views of the automated payment system 100 with the door 120 in a closed position and the handle 128 between the first position and the second position in accordance with various embodiments of the present disclosure. FIG. 2A illustrates a rear perspective view of the automated payment system 100 in the closed position and the handle between the first position and the second position, FIG. 2B illustrates a side perspective view of the automated payment system 100 in the closed position and the handle between the first position and the second position, FIG. 2C illustrates a side view of the automated payment system 100 in the closed position and the handle between the first position and the second position, and FIG. 2D illustrates a rear view of the automated payment system 100 in the closed position and the handle between the first position and the second position. Automated payment systems come in a wide variety of configurations, and FIGS. 2A-2D do not limit the scope of this disclosure to any particular implementation of an automated payment system.

As shown in FIGS. 2A-2D, as the handle 128 is rotated from either the first position to the second position or from the second position to the first position, the handle rotates about the front surface of the door 120. The door includes slots 136 within which the first and second portions of the handle extend. The handle 128 rotates about the hinge from within the slots 136 and can also manipulate the locking mechanism inside the door. The locking mechanism can be coupled to the side portions 130 of the handle such that the locking mechanism is engaged or disengaged when the handle 128 rotates. In some embodiments, the side portions 130 of the handle 128 are configured to hook on an interior surface of the housing 102 when the handle 128 is in the first position to prevent the door 120 from being opened while the handle 128 remains in the first position.

Figure 3A:
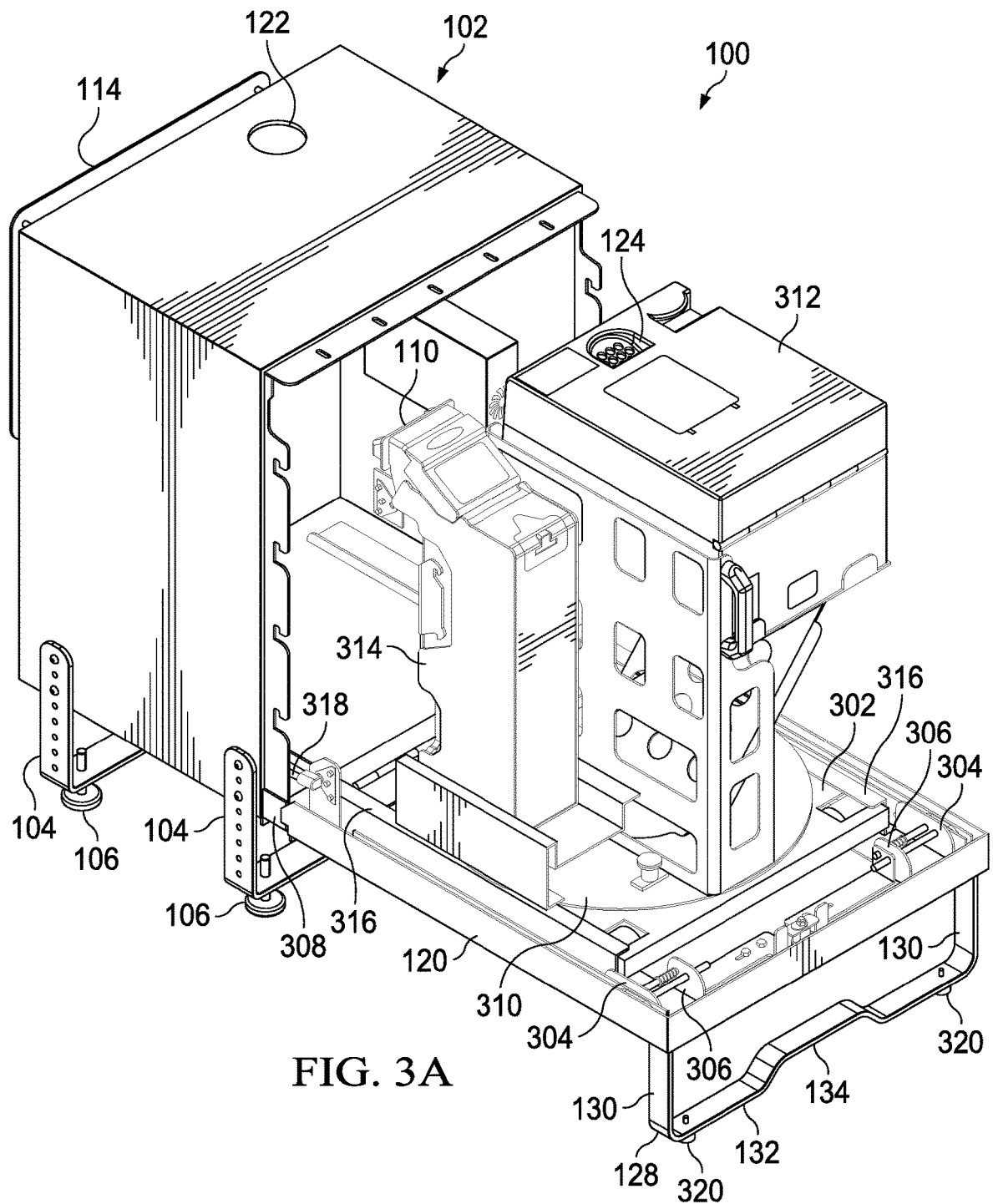
FIG. 3A illustrates a rear perspective view of an automated payment system with a door in an open position in accordance with various embodiments of the present disclosure.
Figure 3B:
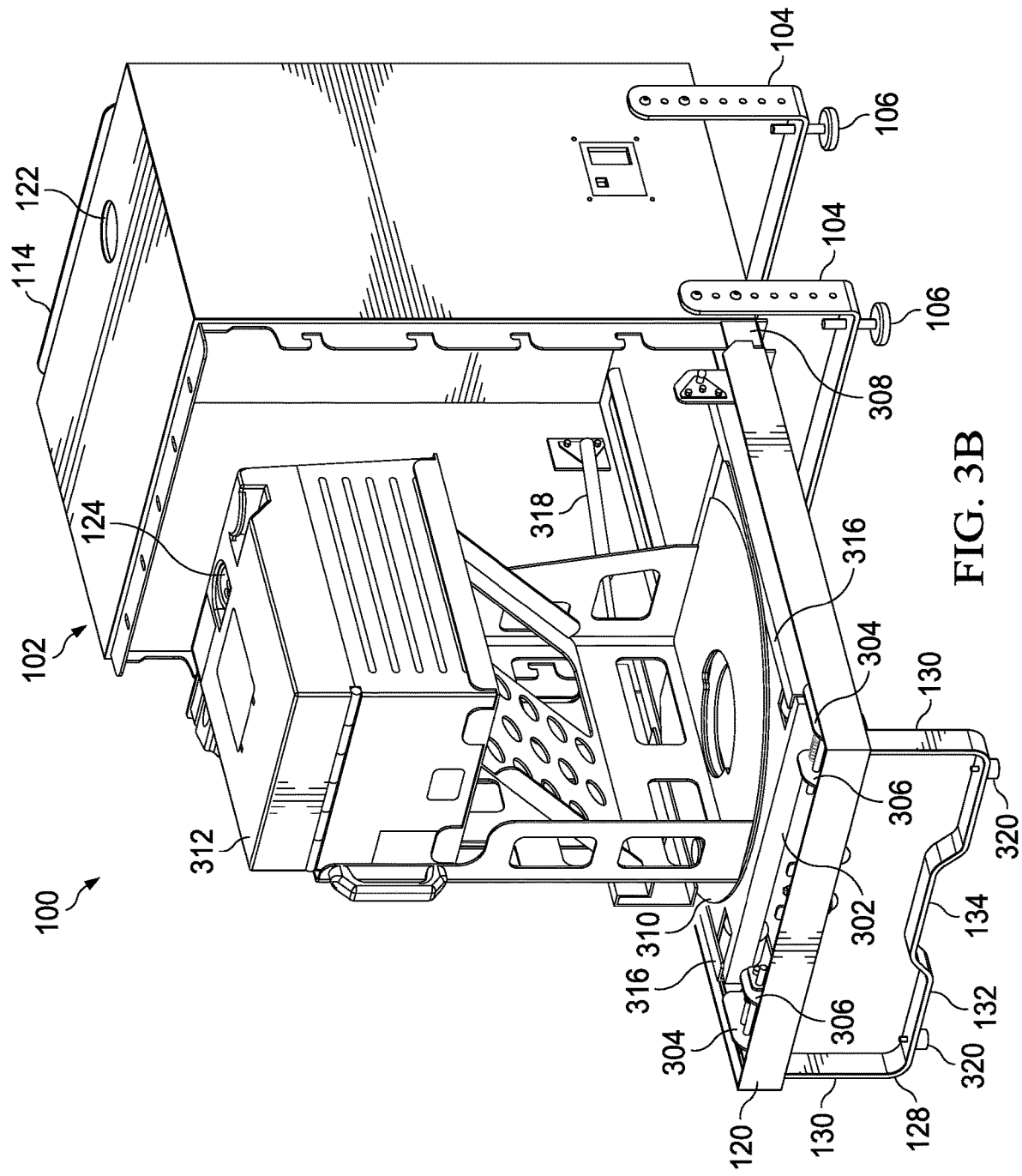
FIG. 3B illustrates a side perspective view of an automated payment system with a door in an open position in accordance with various embodiments of the present disclosure.
Figure 3C:
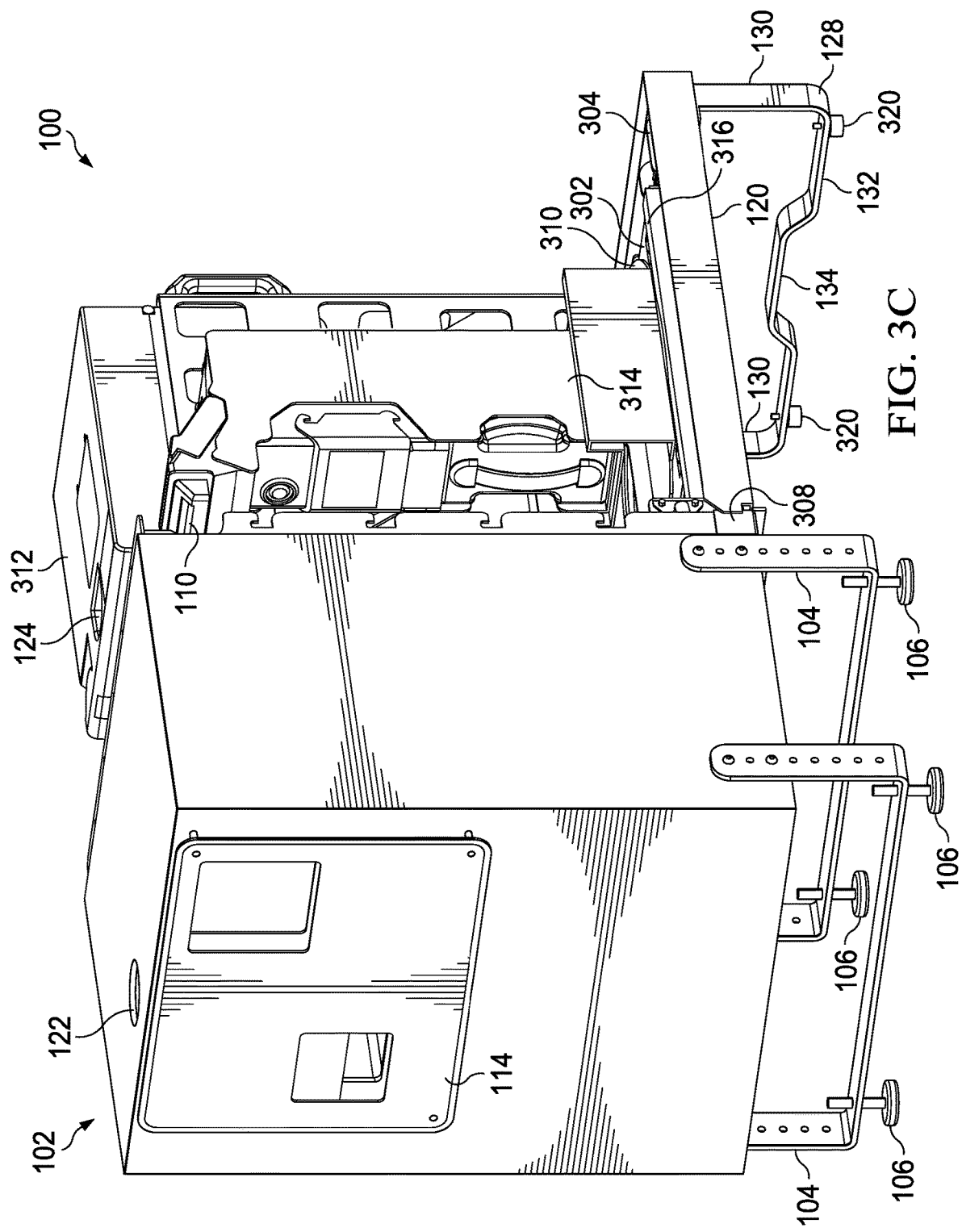
FIG. 3C illustrates a side perspective view of an automated payment system with a door in an open position in accordance with various embodiments of the present disclosure.
Figure 3D:
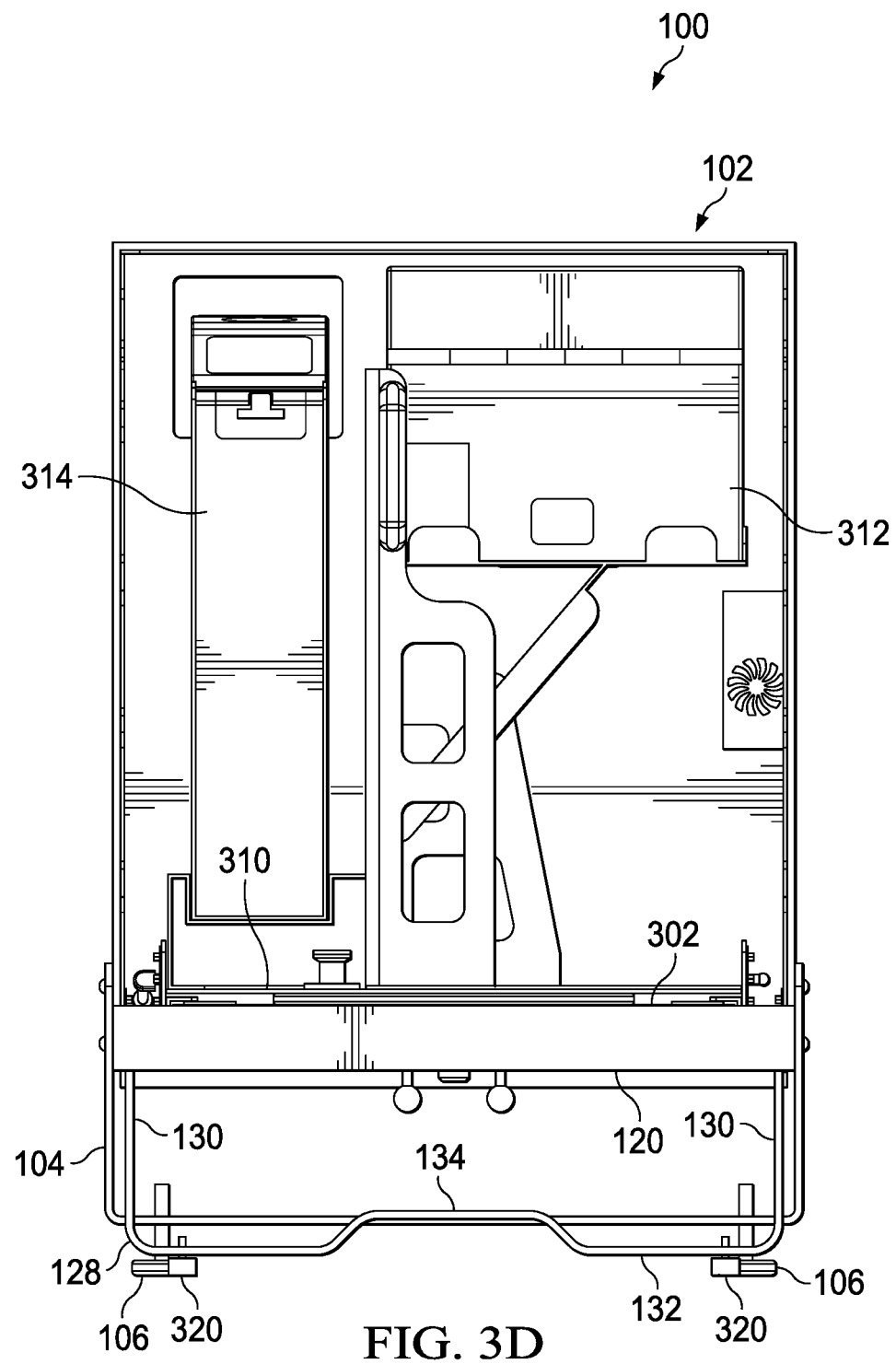
FIG. 3D illustrates a rear view of an automated payment system with a door in an open position in accordance with various embodiments of the present disclosure.
Figure 3E:
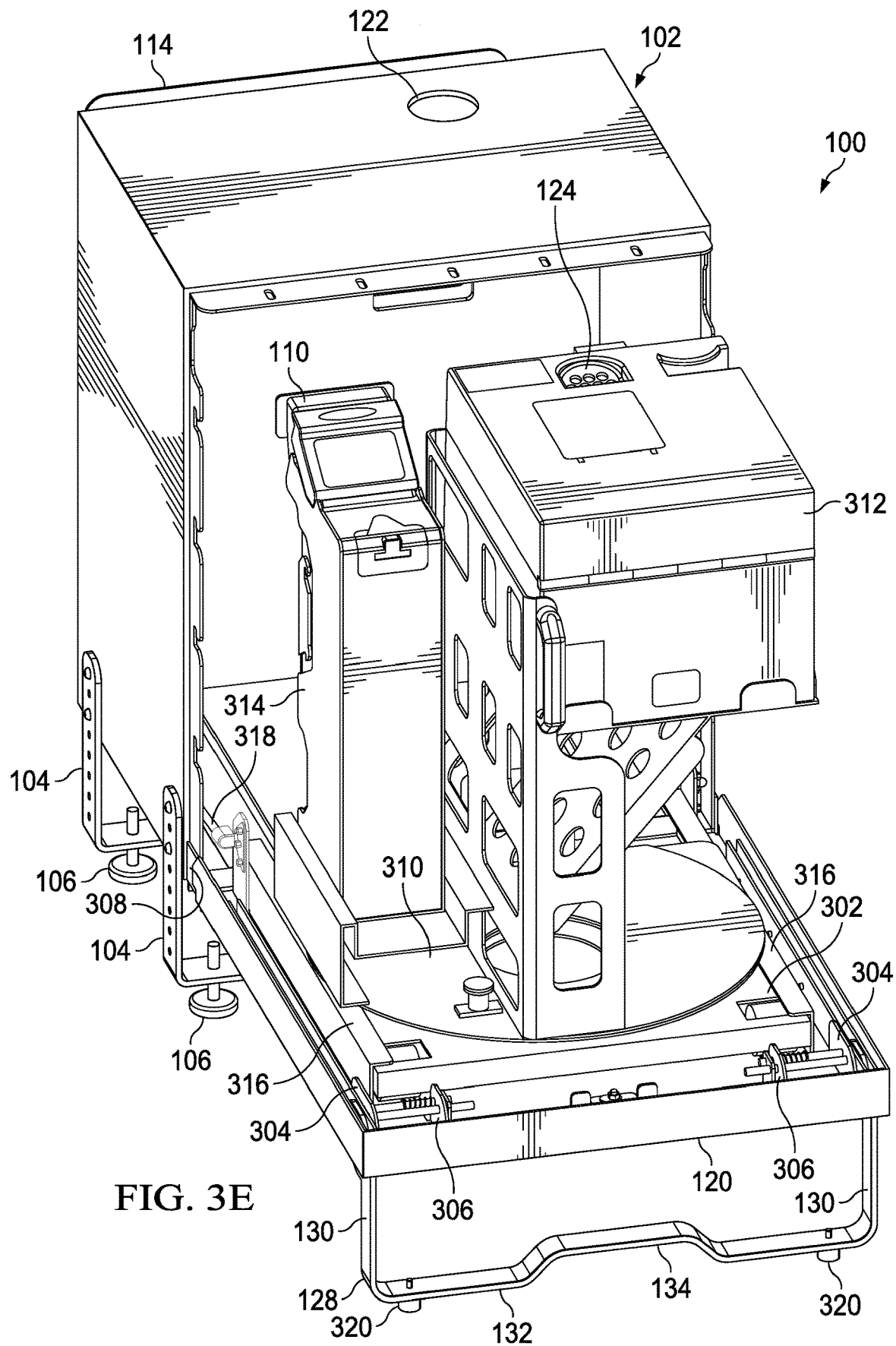
FIG. 3E illustrates another rear perspective view of an automated payment system with a door in an open position in accordance with various embodiments of the present disclosure.
Figure 3F:
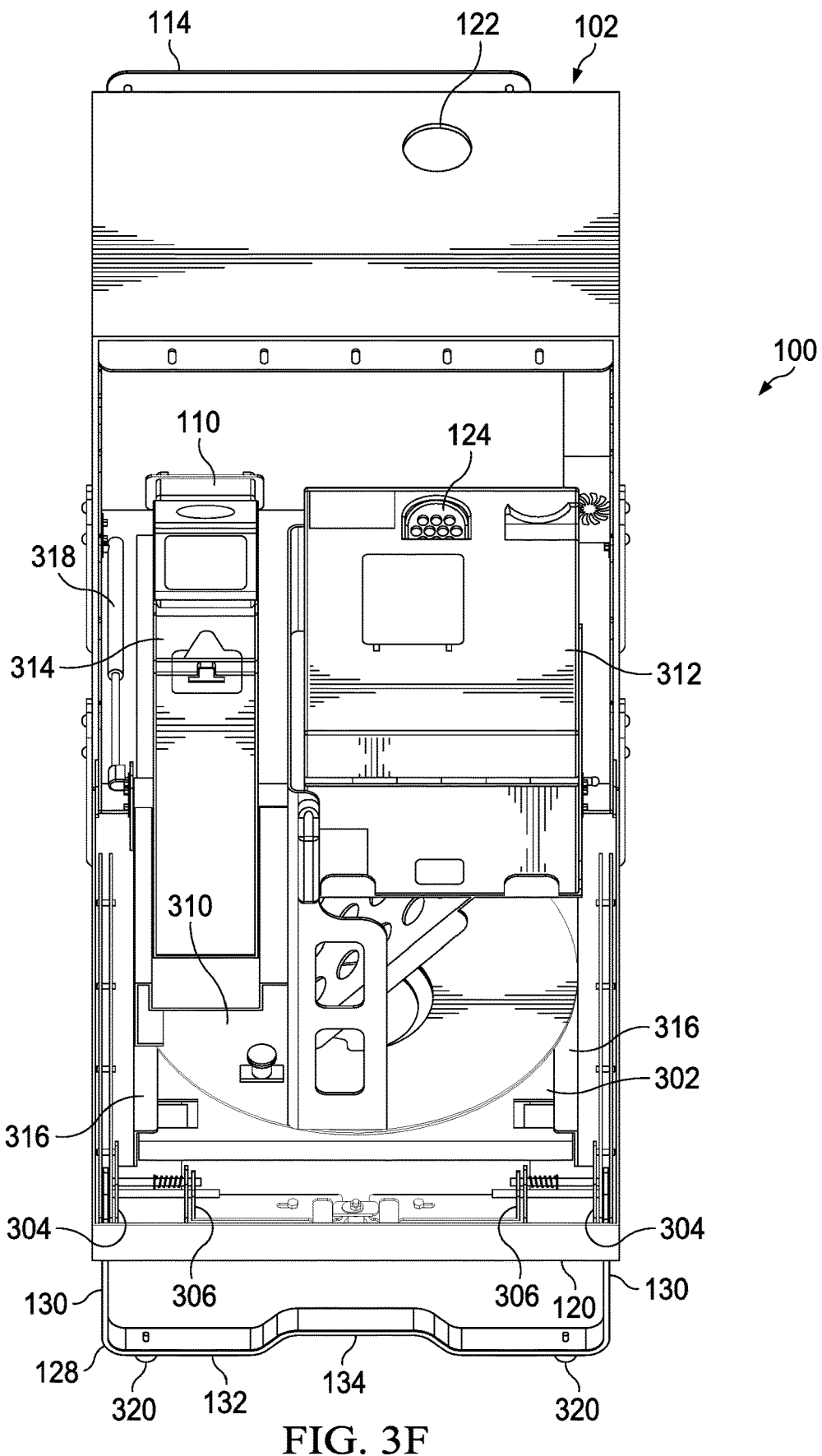
FIG. 3F illustrates a top perspective view of an automated payment system with a door in an open position in accordance with various embodiments of the present disclosure.
Figure 3G:
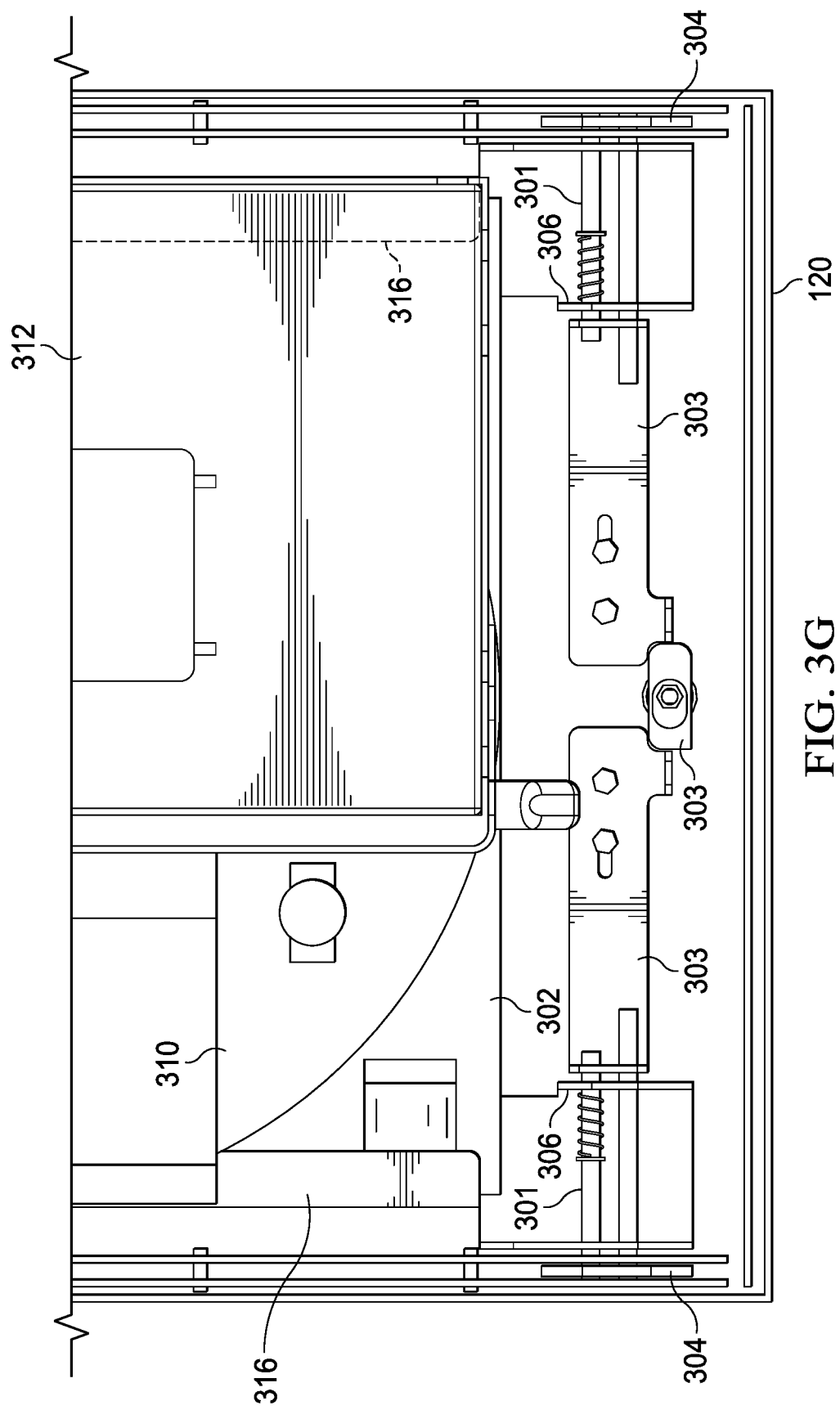
FIG. 3G illustrates a top view of a locking mechanism of a door of an automated payment system in accordance with various embodiments of the present disclosure.
Figure 3H:
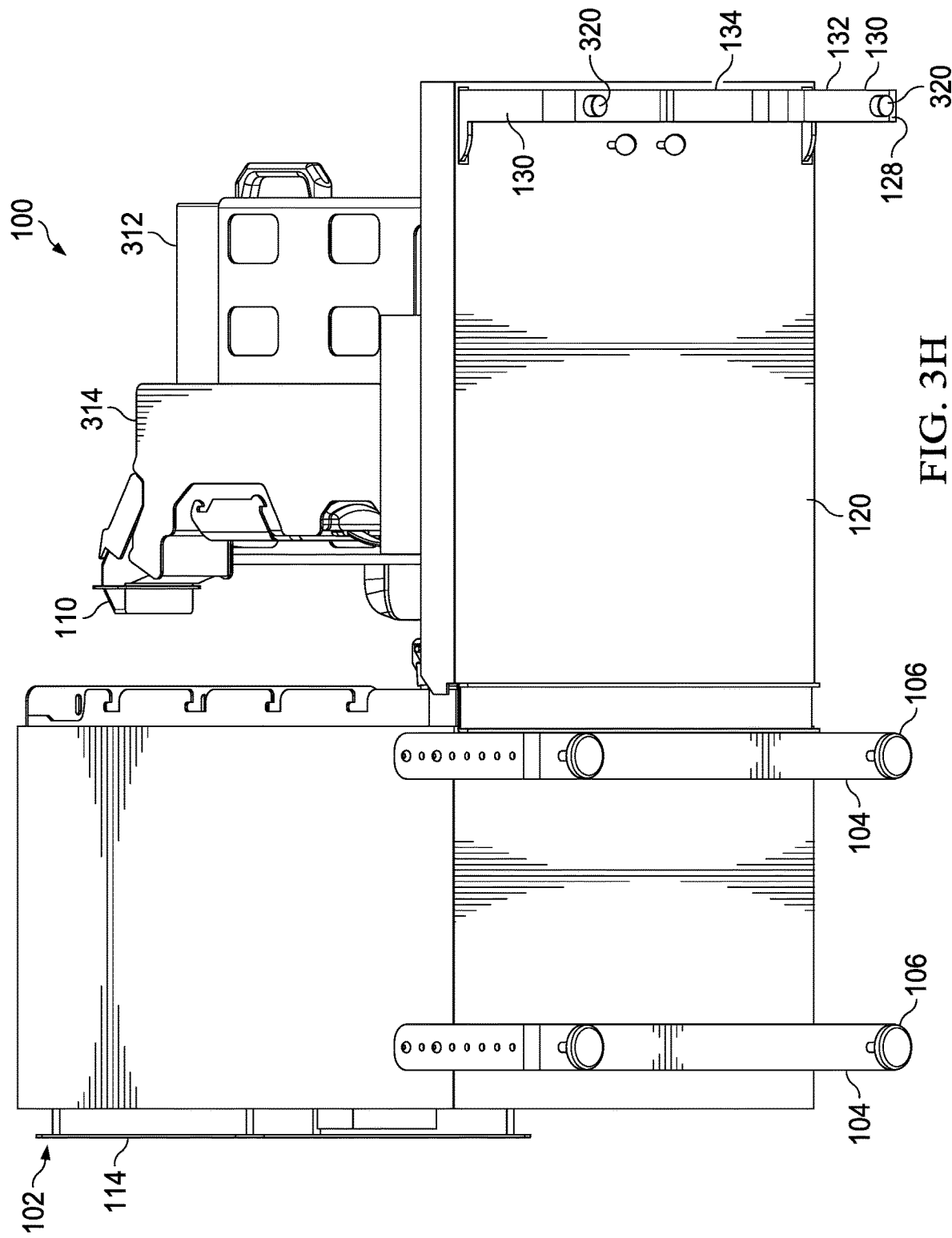
FIG. 3H illustrates a bottom perspective view of an automated payment system with a door in an open position in accordance with various embodiments of the present disclosure.

FIGS. 3A-3H illustrate various views of the automated payment system 100 with the door 120 in an open position, the handle 128 in the second position, and an extendable base 302 extended from the housing 102 of the automated payment system 100 in accordance with various embodiments of the present disclosure. FIG. 3A illustrates a rear perspective view of the automated payment system 100 with the door 120 in an open position, FIG. 3B illustrates a side perspective view of the automated payment system 100 with the door 120 in an open position, FIG. 3C illustrates a side perspective view of the automated payment system 100 with the door 120 in an open position, FIG. 3D illustrates a rear view of the automated payment system 100 with the door 120 in an open position, FIG. 3E illustrates another rear perspective view of the automated payment system 100 with the door 120 in an open position, FIG. 3F illustrates a top perspective view of the automated payment system 100 with the door 120 in an open position, FIG. 3G illustrates a top view of a locking mechanism of the door 120, and FIG. 3H illustrates a bottom perspective view of the automated payment system 100 with the door 120 in an open position. Automated payment systems come in a wide variety of configurations, and FIGS. 3A-3H do not limit the scope of this disclosure to any particular implementation of an automated payment system.

When the handle 128 moves from the first position to the second position, rotating about a hinge 304, and a locking mechanism 306 is disengaged, the door 120 can be moved to an open position, rotating about a hinge 308 on each side of the door 120 connected between the door 120 and the housing 102, the door 120 rotating away from the housing 102 until the door 120 reaches about a 90 degree angle from the closed position, the door 120 extending away from the housing. When the handle 128 is in the second position and the door 120 is in the open position, the handle 128 contacts the ground to provide additional support for the door 120 and the extendable base 302. The locking mechanism 306 as illustrated in FIG. 3G can include spring loaded pins 301 disposed and connected through apertures in and between the hinges 304 and plates 303, the plates 303 coupled to an interior of the door 120. The plates 303 are also connected through the door 120 to the levers 137. In some embodiments, when a key is inserted into the key slot 135, a locking plate 305 is moved to allow the plates 303 to move when the levers 137 are pressed inward towards the center of the door 120, causing the pins 301 to exit the hinges 304, allowing the handle 128 to be rotated. Once the handle 128 is moved from the first position to the second position as shown in FIGS. 3A-3H, the spring loaded pins 301 can reenter the hinges 304 to prevent the hinge from turning. When maintenance on the automated payment apparatus is complete, the door 102 is closed, one or more of the levers 137 can be pressed to allow the handle 128 to be moved from the second position to the first position. The spring loaded pins 301 reengage the hinges 304, and the key can be turned within the key slot 135 to lock the door 120, preventing the plates 303 from moving.

As shown in FIGS. 3A-3H, the payment apparatuses are disposed on a frame atop a rotatable surface 310 and the payment apparatuses include a coin recycler apparatus 312 and a banknote recycler and/or validator apparatus 314. It will be understood that other machines or apparatuses can be included within the housing, and this disclosure is not limited to particular types of machines or apparatuses. The rotatable surface 310 is disposed on top of the extendable base 302 and connected between the extendable base 302 and the payment apparatuses 312, 314, such that the payment apparatus 312, 314 are disposed on the rotatable surface 310. In some embodiments, the payment apparatuses 312, 314 can be disposed on frames secured to the rotatable surface 310. In some embodiments, the extendable base 302 is slidably coupled to the housing 102 via slides 316 that are connected to an interior wall of the housing 102 and that can be extended from within the housing 102 to move the extendable base 302 and the payment apparatuses 312, 314 out of the housing 102 of the automated payment system 100. Slidably coupled can include sliding assemblies such as sliding track assemblies, telescopic assemblies wherein a plurality of pieces fit and slide within each other, or other sliding mechanisms. While the slides 316 are extended, maintenance, currency retrieval, or other tasks can be performed on the payment apparatuses 312, 314. The slides 316 also allow for the extendable base 302 and the payment apparatuses 312, 314 to be returned to the interior of the housing 102 by pushing the extendable base 302 along the slides 316 into the housing 102. The slides 316 can have coupled thereto one or more hydraulic supports 318 to provide for a smooth operation of the slides 316 while also decreasing the speed of the slides 316 when the slides 316 reach a retracted position within the interior of the housing 102.

In the example shown in FIGS. 3A-3H, the slides 316 have been extended such that the extendable base 302 carrying the rotatable surface 310 and the payment apparatuses 312, 314 is extended out over an interior side of the door 120. Payment apparatuses such as those shown in FIGS. 3A-3H can be heavy, which can cause strain or even damage to the slides 316, the door 120, or other components of the automated payment system 100 when the slides 316 are extended. To counteract the weight of the payment apparatuses 312, 314, the handle 128 can be moved to the second position so that it contacts the ground or some other surface, as shown in FIGS. 3A-3H. The handle 128 thus supports the door 120, the slides 316, and the extendable base 302 carrying the weight of the payment apparatuses 312, 314, and moves the center of gravity out of the automated payment system 100.

The handle 128 can also include one or more feet 320 coupled to the handle 128, such that the feet 320 contact the ground or another surface when the door 120 is opened. The feet 320 can be made of plastic, rubber, or other materials that can support the weight of the payment apparatuses 312, 314 and that can also avoid damaging the surface that the feet 320 contact when the door 120 is opened. In some embodiments, the handle 128 is extendable so that, if the automated payment system 100 is installed at a particular height from the ground, the handle 128 can still extend down to the ground to provide support for the slides 316 and the door 120. In some embodiments, the handle 128 includes three pieces disposed within each other such that the handle 128 extends telescopically.

Figure 4A:
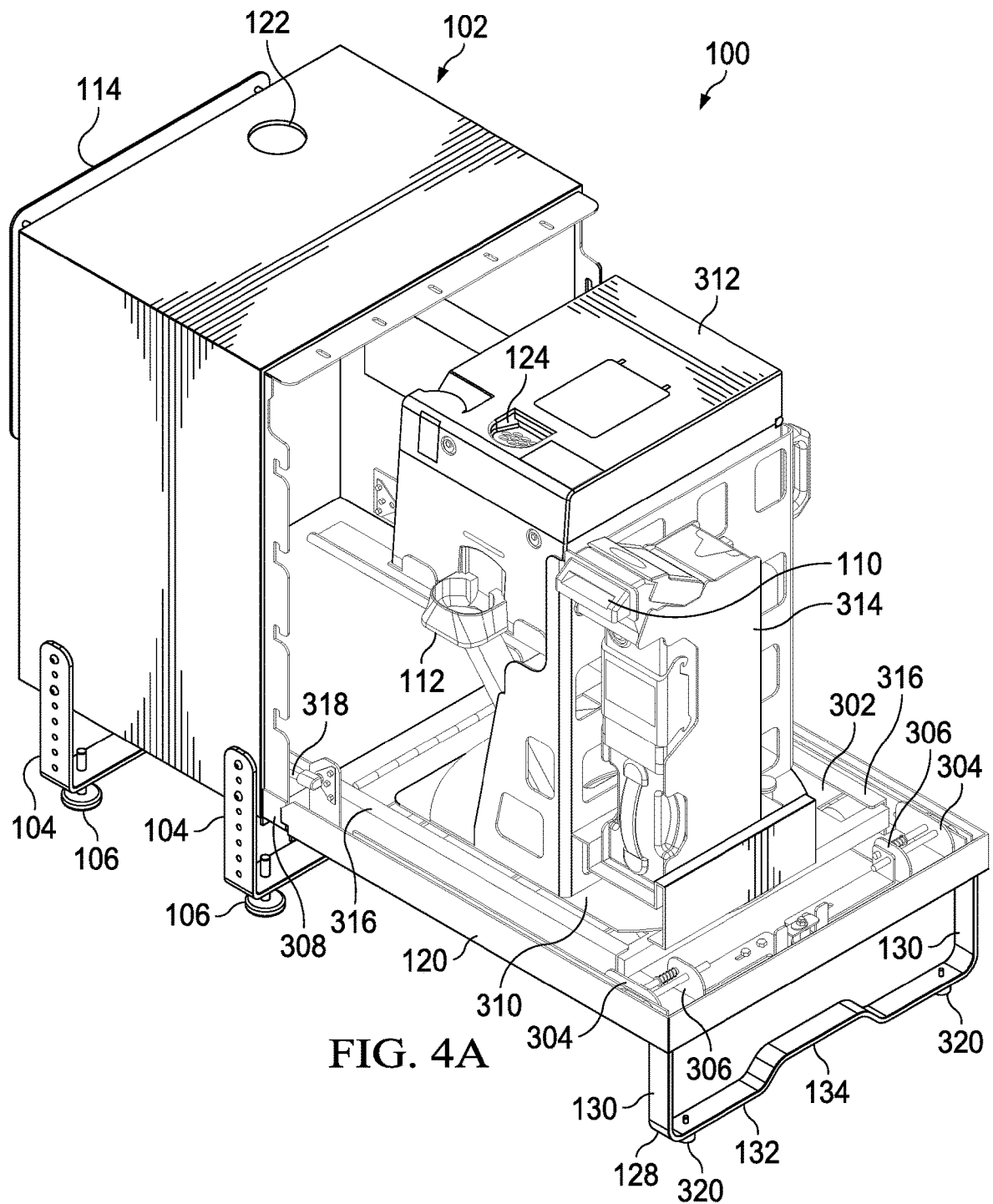
FIG. 4A illustrates a rear perspective view of an automated payment system with a rotatable surface rotated to 90 degrees in accordance with various embodiments of the present disclosure.
Figure 4B:
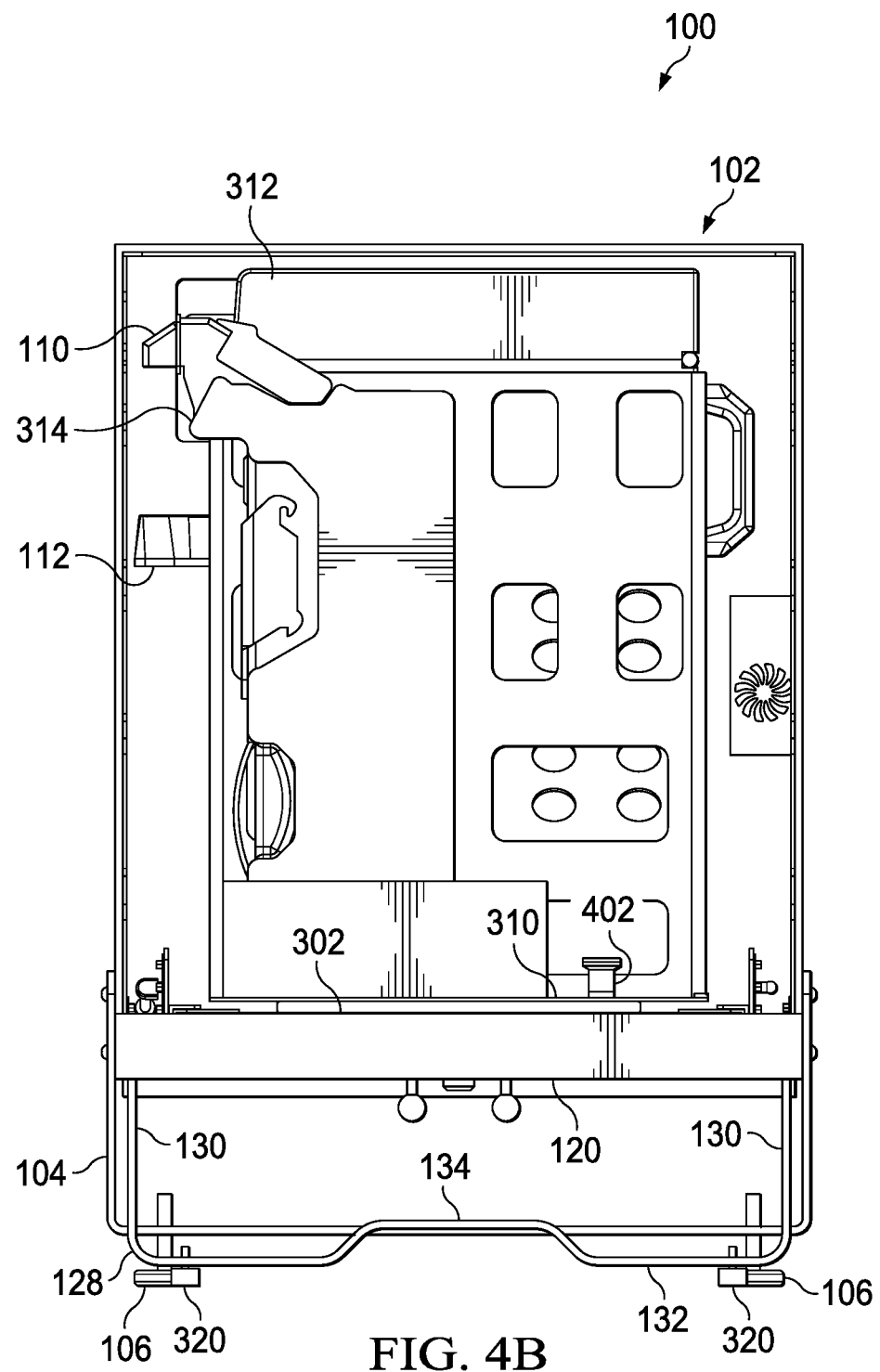
FIG. 4B illustrates a rear view of an automated payment system with a rotatable surface rotated to 90 degrees in accordance with various embodiments of the present disclosure.
Figure 4C:
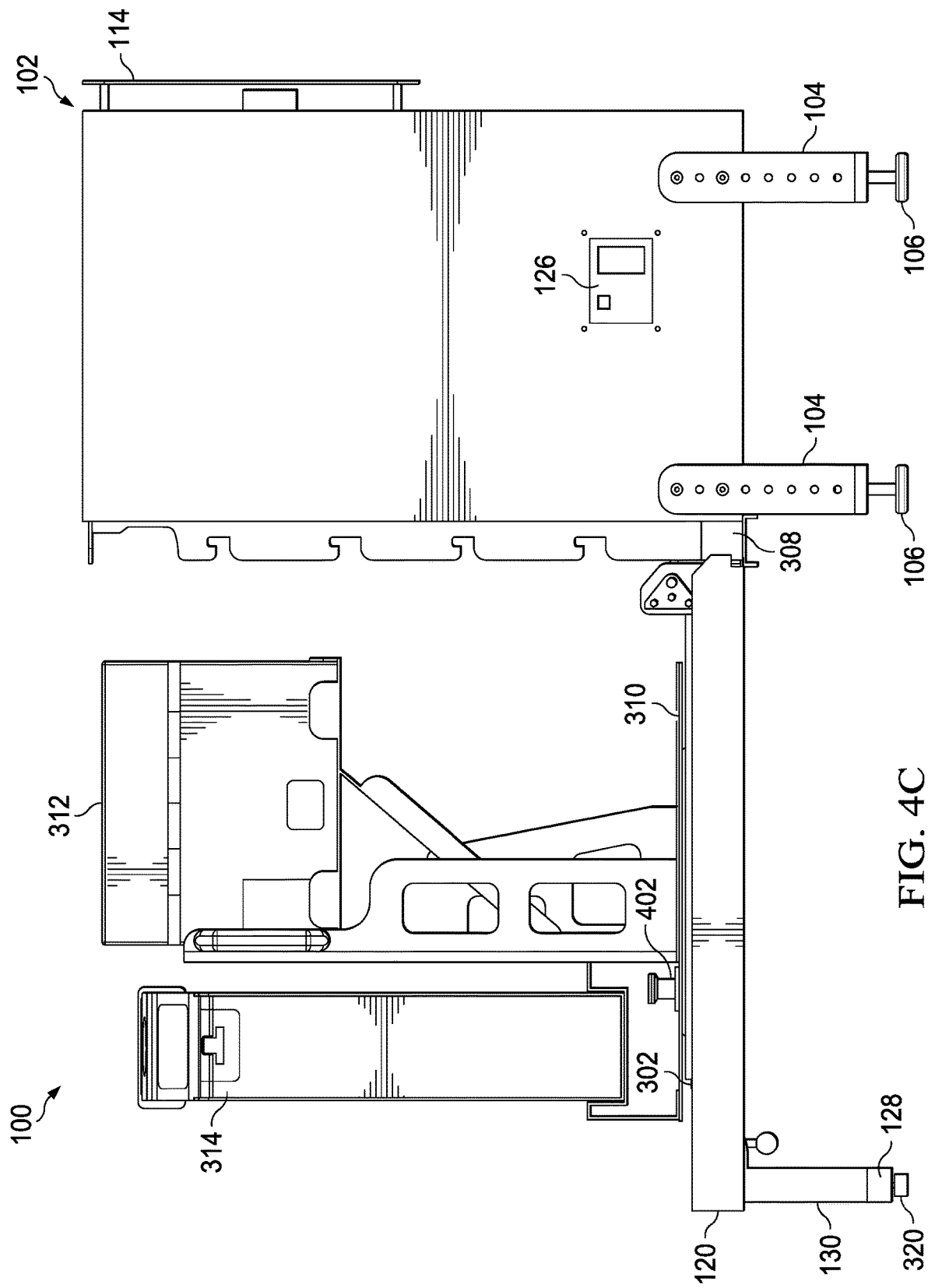
FIG. 4C illustrates a side view of an automated payment system with a rotatable surface rotated to 90 degrees in accordance with various embodiments of the present disclosure.
Figure 4D:
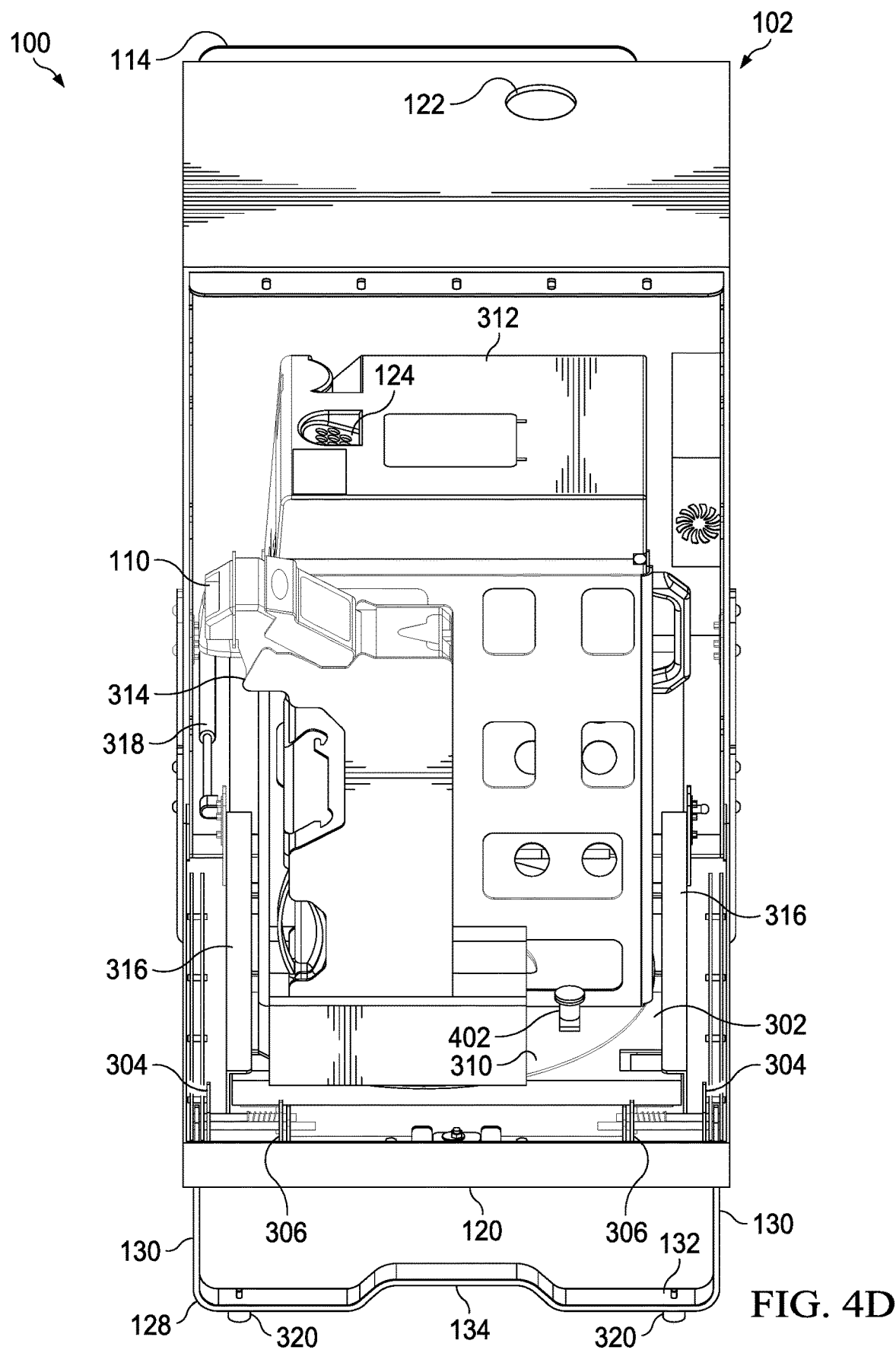
FIG. 4D illustrates a top perspective view of an automated payment system with a rotatable surface rotated to 90 degrees in accordance with various embodiments of the present disclosure.
Figure 4E:
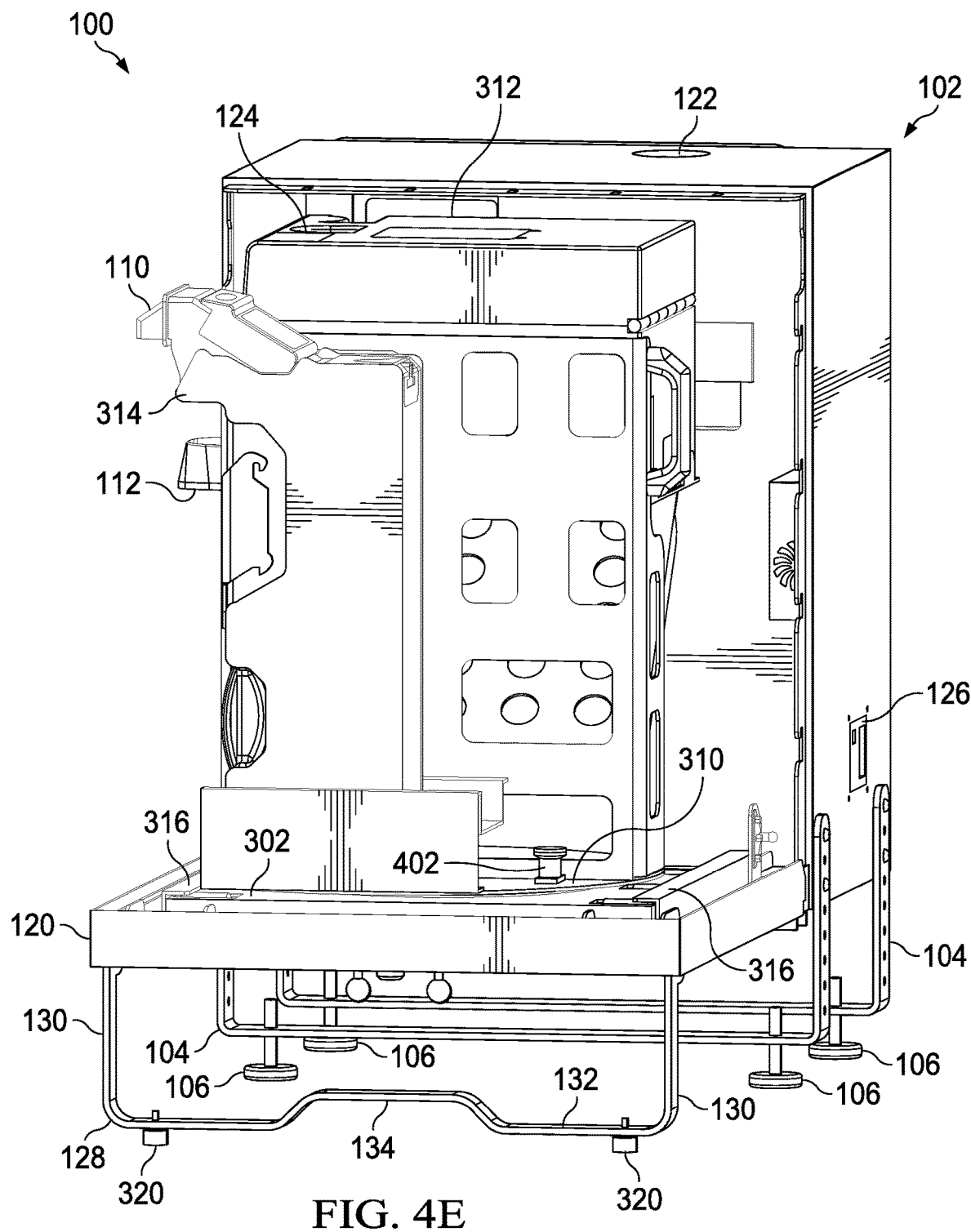
FIG. 4E illustrates another rear perspective view of an automated payment system with a rotatable surface rotated to 90 degrees in accordance with various embodiments of the present disclosure.

FIGS. 4A-4E illustrate various views of the automated payment system 100 with the rotatable surface 310 rotated to 90 degrees in accordance with various embodiments of the present disclosure. FIG. 4A illustrates a rear perspective view of the automated payment system 100 with the rotatable surface 310 rotated to 90 degrees, FIG. 4B illustrates a rear view of the automated payment system 100 with the rotatable surface 310 rotated to 90 degrees, FIG. 4C illustrates a side view of the automated payment system 100 with the rotatable surface 310 rotated to 90 degrees, FIG. 4D illustrates a top perspective view of the automated payment system 100 with the rotatable surface 310 rotated to 90 degrees, and FIG. 4E illustrates another rear perspective view of the automated payment system 100 with the rotatable surface 310 rotated to 90 degrees. Automated payment systems come in a wide variety of configurations, and FIGS. 4A-4E do not limit the scope of this disclosure to any particular implementation of an automated payment system.

The rotatable surface 310 is operable to rotate on the extendable base 302 to allow access to various areas of the payment apparatuses 312, 314. The rotatable surface 310 can also lock in place between different positions. For example, the rotatable surface 310 can rotate to a first position shown in FIGS. 3A-3H, a second position shown in FIGS. 4A-4E, and a third position shown in FIGS. 5A and 5B, locking at each position. A release pin 402 extends through the rotatable surface 310 and an aperture in the extendable base 302 when the rotatable surface 310 reaches each position. The release pin 402 can then be pulled up by a user to unlock the rotatable surface 310 from one of the positions to allow the rotatable surface 310 to be rotated. In some embodiments, the rotatable surface 310 rotates between the second and third positions from the first position.

As shown in FIGS. 4A-4E, the second position is reached by rotating the rotatable surface 310 90 degrees in a counter-clockwise direction. The second position can allow for the banknote recycler 314 to be accessed for maintenance, banknote retrieval and/or cashbox removal, or other tasks. Once the tasks are completed, the release pin 402 can be used to unlock the rotatable base 310. The rotatable base 310 can then be rotated back in a clockwise direction to the first position, and the extendable base 302 can be pushed back into the housing 102 via the slides 316, the hydraulic supports 318 preventing the extendable base 302 from being pushed back into the housing 102 too quickly, avoiding damage to the slides 316, the extendable base 302, the payment apparatuses 312, 314, or other components of the automated payment system 100. In some embodiments, each of the positions of the rotatable base 310 can be reached by turning the rotatable base 310 in any direction, with the rotatable base 310 in some embodiments operable to perform full rotations about the extendable base 302.

Figure 5A:
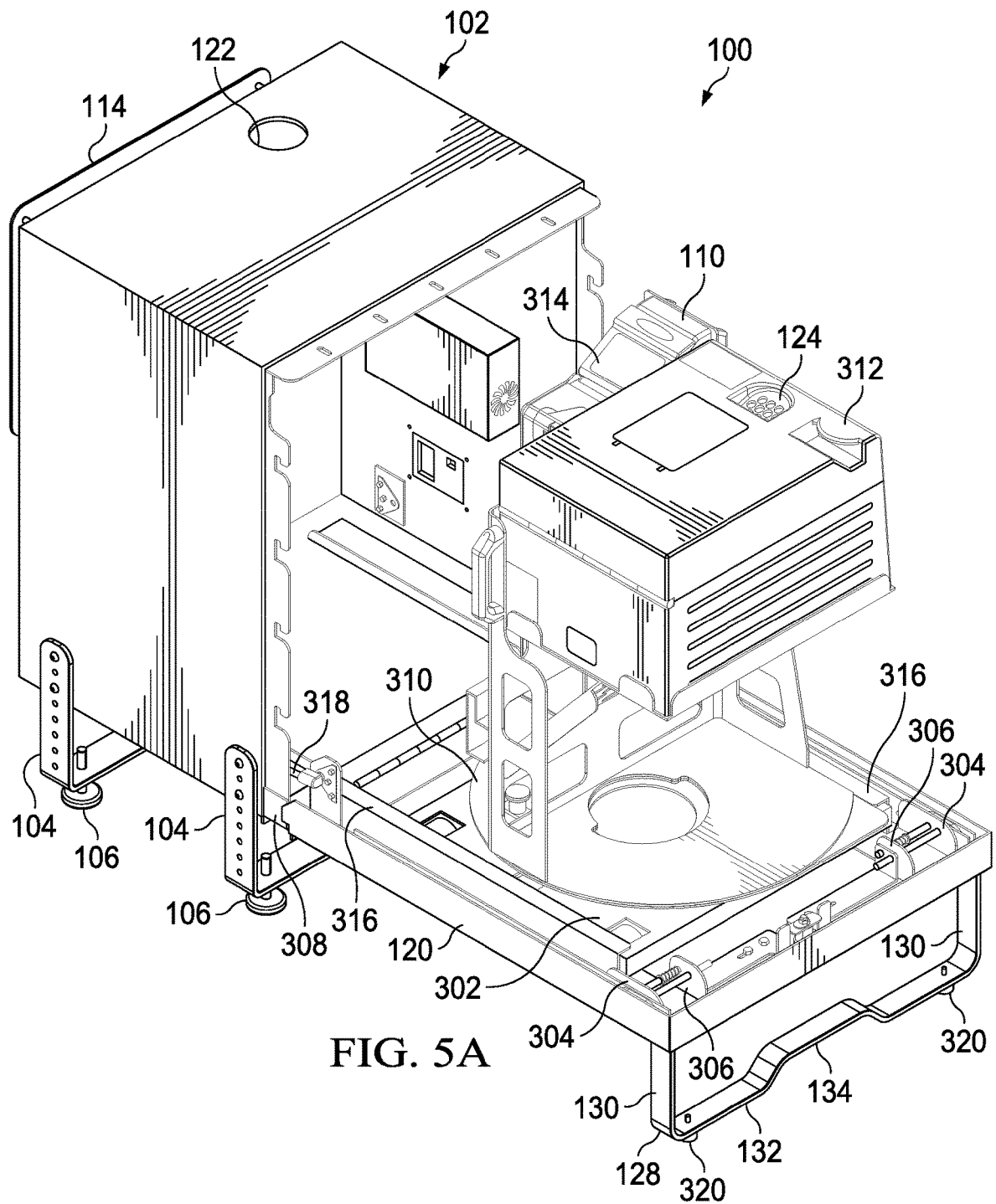
FIG. 5A illustrates a side perspective view of an automated payment system with a rotatable surface rotated to 180 degrees in accordance with various embodiments of the present disclosure.
Figure 5B:
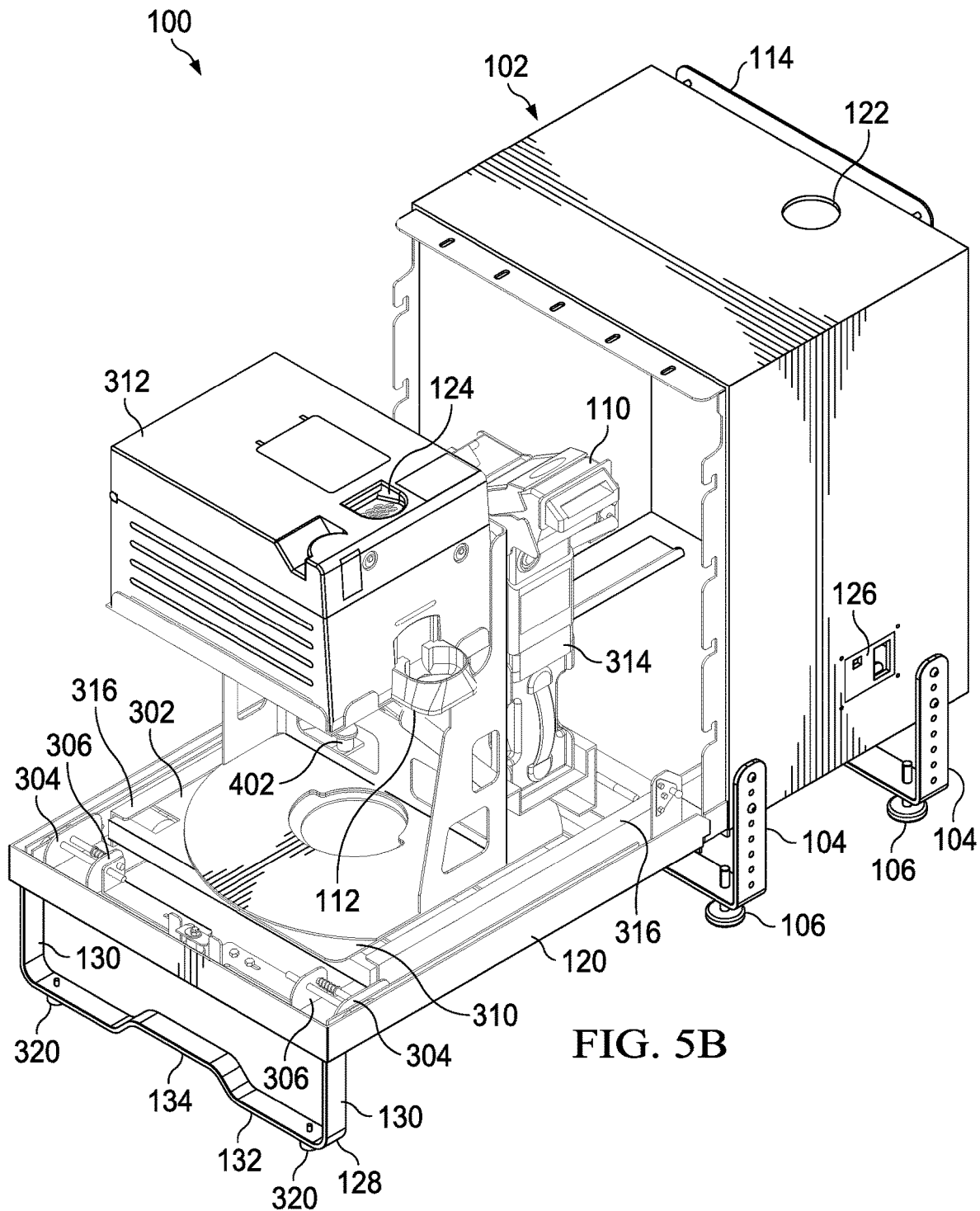
FIG. 5B illustrates a rear perspective view of an automated payment system with a rotatable surface rotated to 180 degrees in accordance with various embodiments of the present disclosure.

FIGS. 5A and 5B illustrate various views of the automated payment system 100 with the rotatable surface 310 rotated to 270 degrees in accordance with various embodiments of the present disclosure. FIG. 5A illustrates a side perspective view of the automated payment system 100 with the rotatable surface 310 rotated to 270 degrees, and FIG. 5B illustrates a rear perspective view of the automated payment system 100 with the rotatable surface 310 rotated to 270 degrees. Automated payment systems come in a wide variety of configurations, and FIGS. 5A and 5B do not limit the scope of this disclosure to any particular implementation of an automated payment system.

In some embodiments, to reach the third position shown in FIGS. 5A and 5B, the rotatable surface 310 is rotated from the first position shown in FIGS. 3A-3H by 90 degrees in a clockwise direction. The third position can allow for the coin recycler 312 to be accessed for maintenance, coin retrieval, or other tasks. Once the tasks are completed, the release pin 402 can be used to unlock the rotatable base 310. The rotatable base 310 can then be rotated back in a counter-clockwise direction to the first position, and the extendable base 302 can be pushed back into the housing 102 via the slides 316, the hydraulic supports 318 preventing the extendable base 302 from being pushed back into the housing 102 too quickly, avoiding damage to the slides 316, the extendable base 302, the payment apparatuses 312, 314, or other components of the automated payment system 100. In some embodiments, each of the positions of the rotatable base 310 can be reached by turning the rotatable base 310 in any direction, with the rotatable base 310 in some embodiments operable to perform full rotations about the extendable base 302.

Figure 6A:
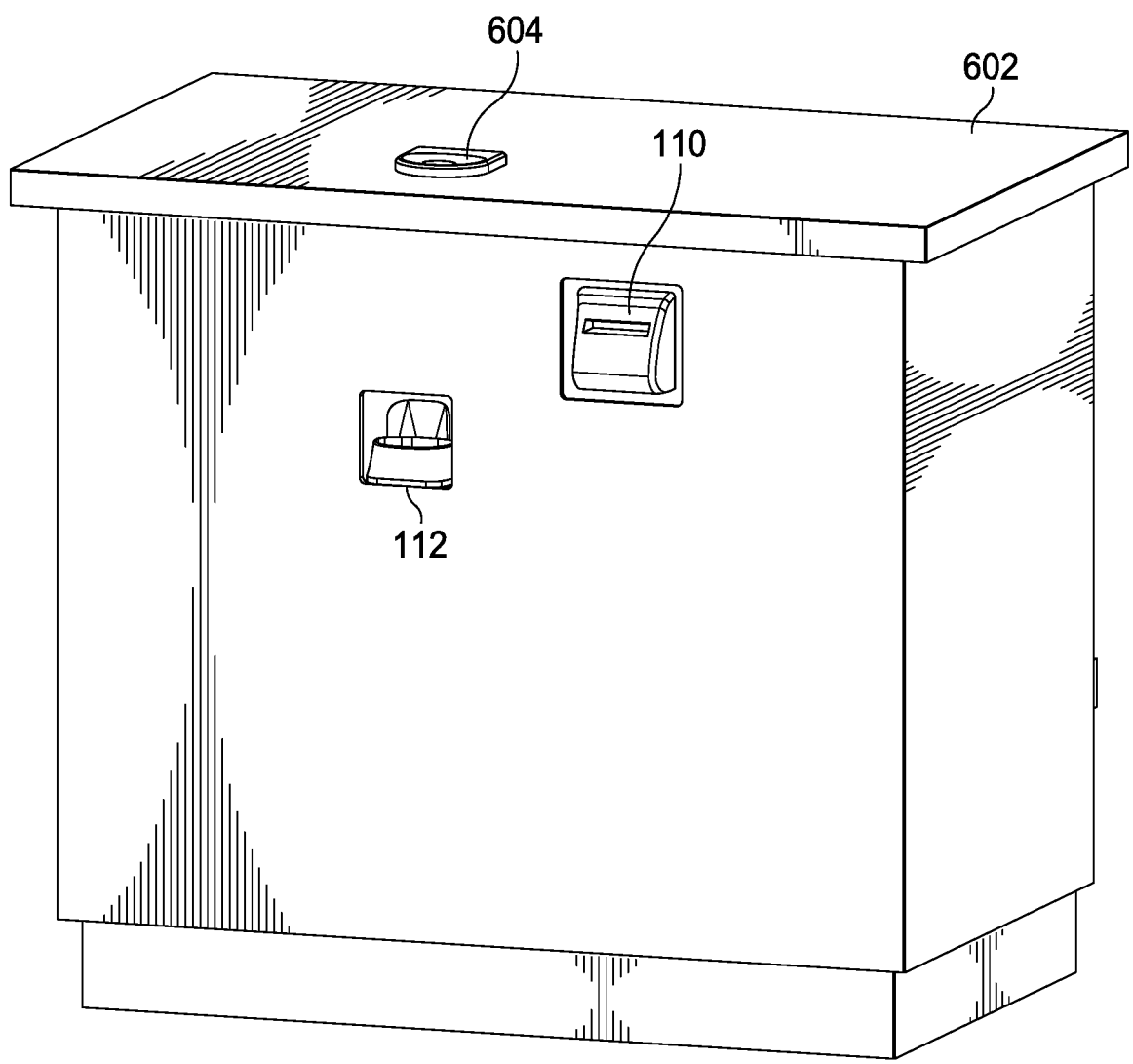
FIG. 6A illustrates a front perspective view of an automated payment system installed within a counter or cabinet in accordance with various embodiments of the present disclosure.
Figure 6B:
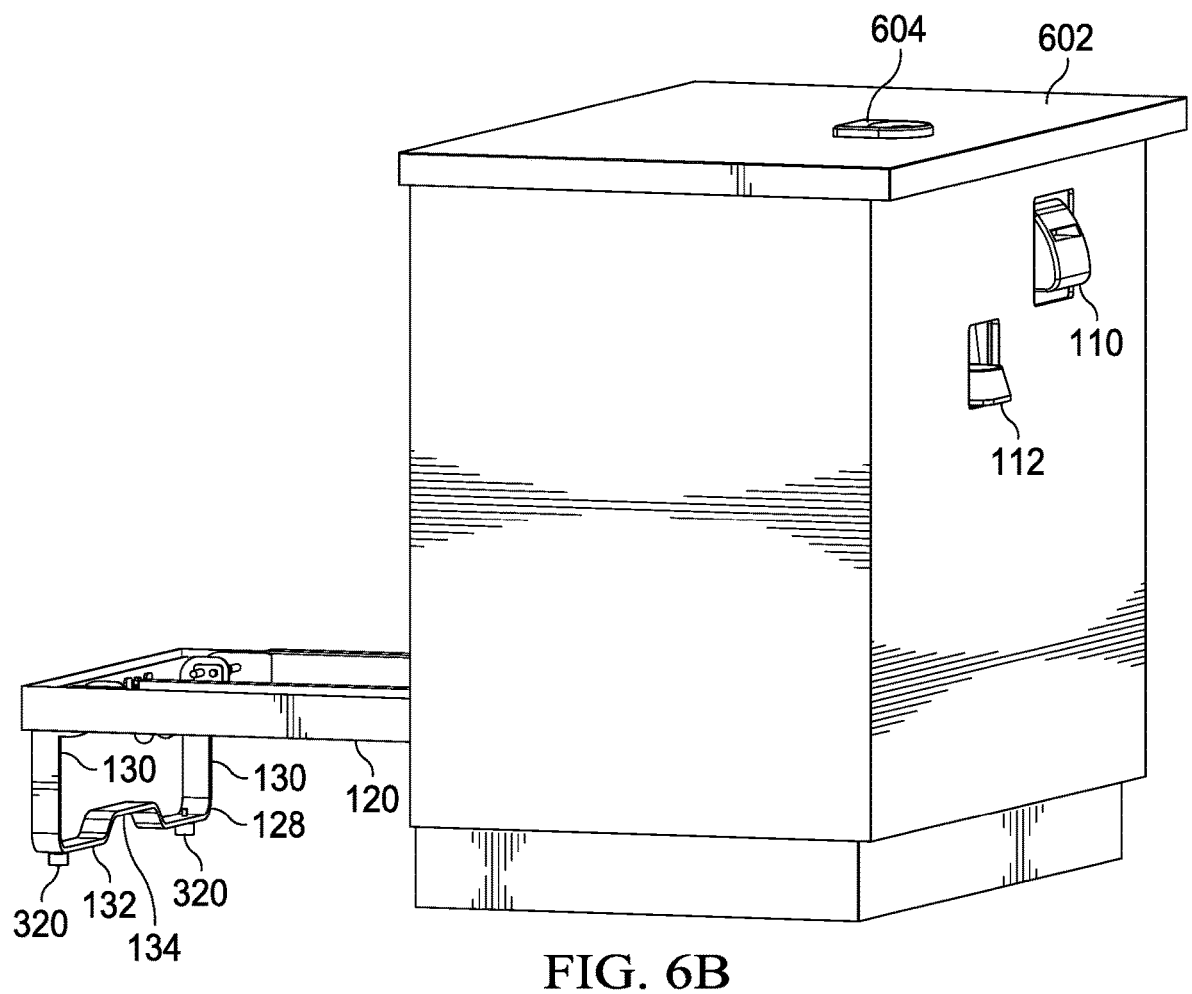
FIG. 6B illustrates a side perspective view of an automated payment system installed within a counter or cabinet in accordance with various embodiments of the present disclosure.
Figure 6C:
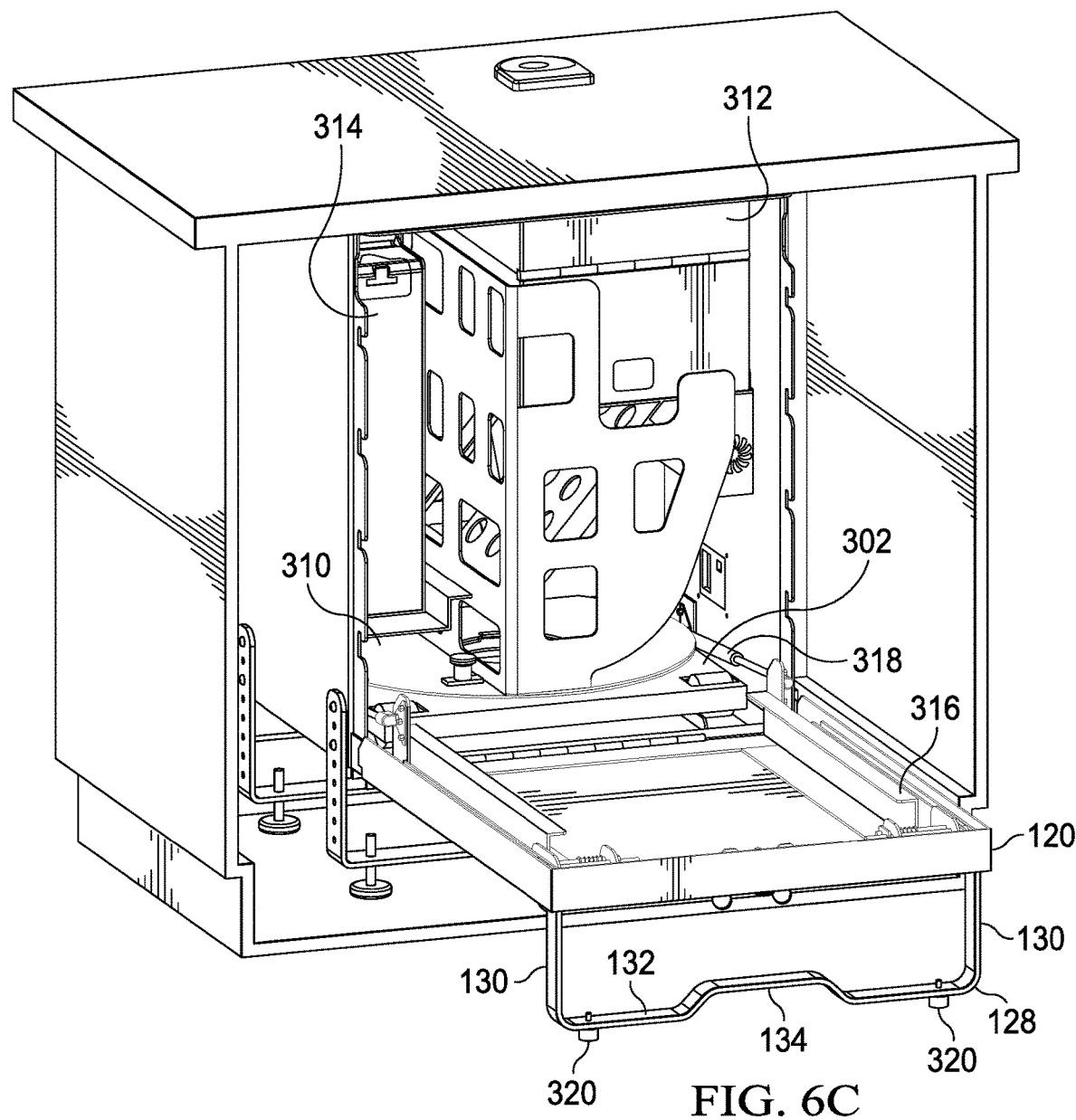
FIG. 6C illustrates a rear perspective view of an automated payment system installed within a counter or cabinet in accordance with various embodiments of the present disclosure.
Figure 6D:
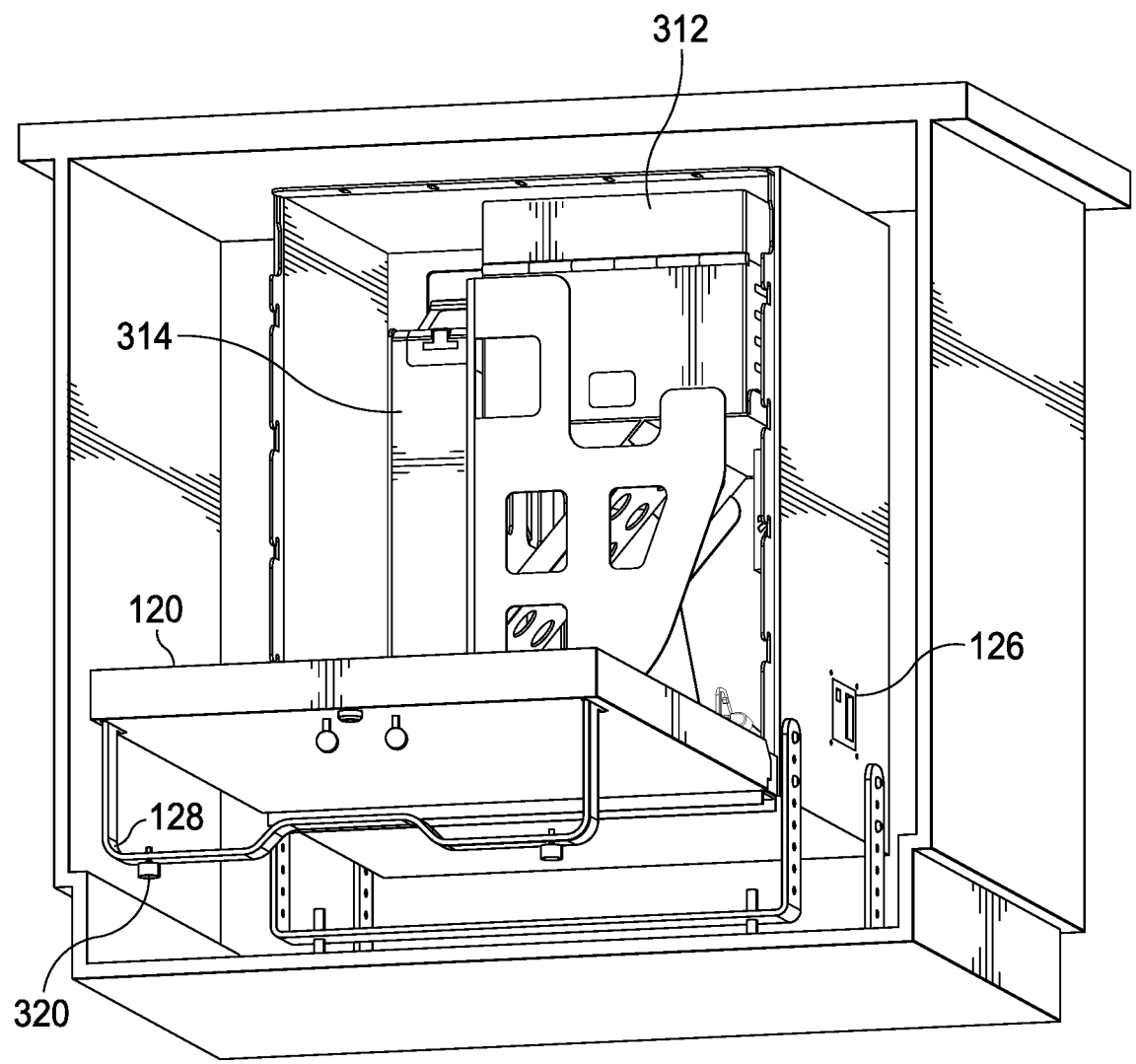
FIG. 6D illustrates another rear perspective view of an automated payment system installed within a counter or cabinet in accordance with various embodiments of the present disclosure.

FIGS. 6A-6D illustrate various views of the automated payment system 100 installed within a counter or cabinet 602 in accordance with various embodiments of the present disclosure. FIG. 6A illustrates a front perspective view of the automated payment system 100 installed within the cabinet 602, FIG. 6B illustrates a side perspective view of the automated payment system 100 installed within the cabinet 602, FIG. 6C illustrates a rear perspective view of the automated payment system 100 installed within the cabinet 602, and FIG. 6D illustrates another rear perspective view of the automated payment system 100 installed within the cabinet 602. Automated payment systems and counters or cabinets can come in a wide variety of configurations, and FIGS. 6A-6D do not limit the scope of this disclosure to any particular implementation of an automated payment system, counter, or cabinet.

As illustrated in FIGS. 6A-6D, the automated payment system 100 can be installed within the counter or cabinet 602 or other point-of-sale location. Point-of-sale equipment located on or near the cabinet 602 can be communicatively connected to the payment apparatuses located within the cabinet 602. In some embodiments, the payment interaction panel 114 (not shown) can fit within a cutout in the cabinet 602 so that customers only see the payment interaction panel and the currency exchange interfaces. In other embodiments, the payment interaction panel 114 can be excluded, or can be installed on the front of the cabinet 602. A cutout 604 in the top of the cabinet 602 positioned above the aperture 122 of the housing 102 and above the currency deposit interface 124 of the coin recycling apparatus 312 allows for coins to be deposited in the coin recycling apparatus 312. When authorized personnel need to access the payment apparatuses 312, 314, the door 120 of the housing 102 is accessed from the back of the cabinet 602 and opened via the handle 128 to reveal the payment apparatuses 312, 314. The handle 128 is rotated such that the handle 128 via the feet 320 contacts the ground or other surface to provide support for the door 120 and the extendable base 302. The extendable base 302 can then be pulled from within the housing 102 and extended out from the housing 102 and from the cabinet 602 to perform tasks on the payment apparatuses 312, 314. The authorized personnel can then rotate the rotatable surface 310 as needed to access areas of the payment apparatuses 312, 314. When the authorized personnel is finished with the tasks, the authorized personnel rotates the rotatable surface 310 back to the first position, pushes the extendable base 302 back into the housing 102, closes the door 120, and moves the handle 128 from the second position to the first position and locks the door 120.

Figure 7:
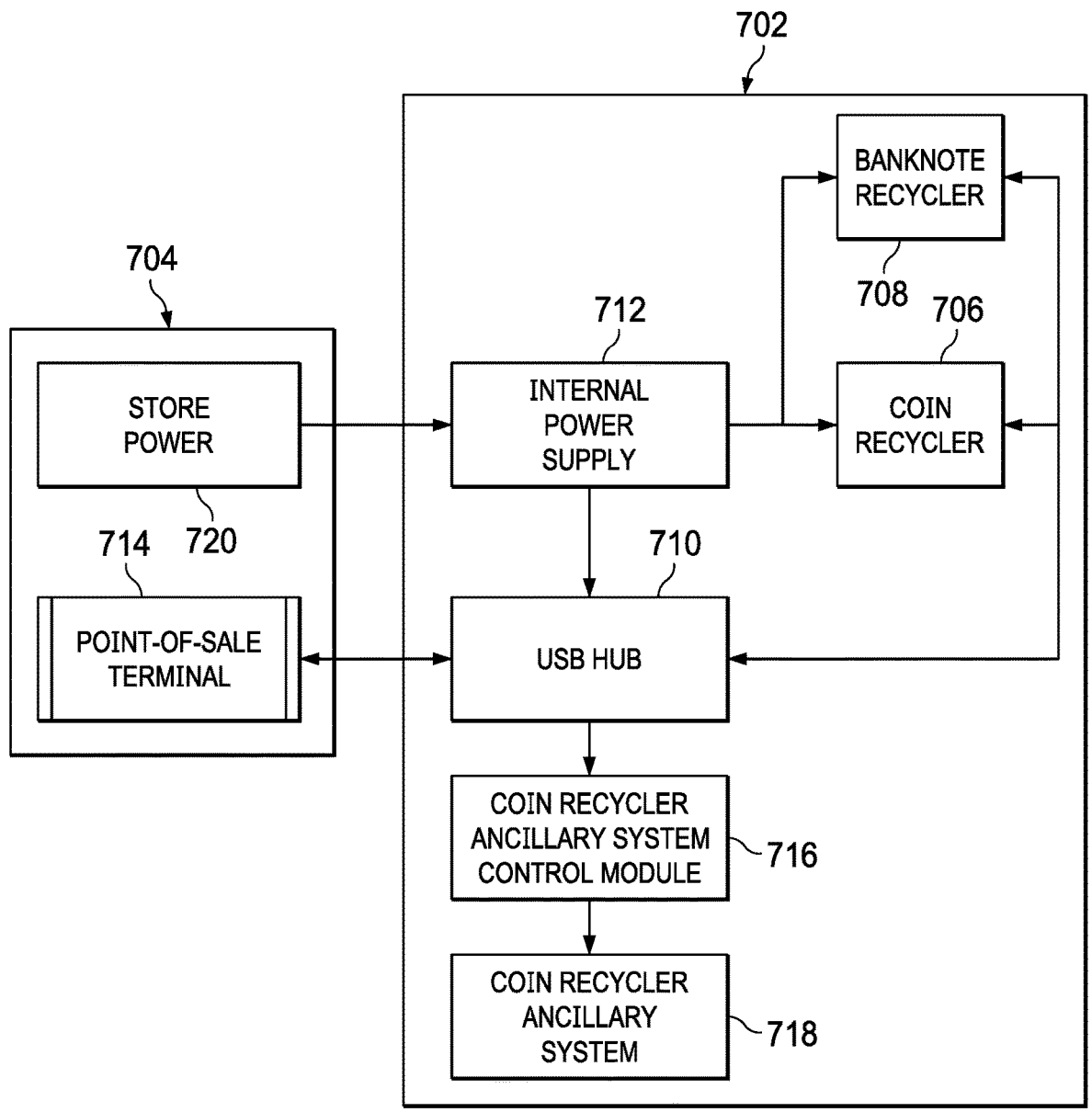
FIG. 7 illustrates a block diagram of an interconnected automated payment system and retail store system in accordance with various embodiments of the present disclosure.

FIG. 7 illustrates a block diagram of an interconnected automated payment system 702 and retail store system 704. In this example, the automated payment system 702 includes a coin recycler 706 and banknote recycler 708 each connected to a Universal Serial Bus (USB) hub 710 and an internal power supply 712 of the automated payment system 702. In some embodiments, the coin recycler 706 and the banknote recycler 708 can be the coin recycler apparatus 312 and the banknote recycler and/or validator apparatus 314, respectively, as disclosed herein. The USB hub 710 is further connected to a point-of-sale terminal 714 of the retail store system 704. The USB hub 710 acts as a single point for a data connection between the automated payment system 702 and the point-of-sale terminal 714 of the retail store system 704, linking both the coin recycler 706 and the banknote recycler 708 to the point-of-sale terminal 714. A coin recycler ancillary system control module 716 is also connected to the USB hub 710. The coin recycler ancillary system control module 716 is further connected to a coin recycler ancillary system 718. In some embodiments, the coin recycler ancillary system 718 receives both data and power from the USB hub 710.

The internal power supply 712 of the automated payment system 702 acts as a single point for a power connection between a store power system 720 of the retail store system 704 and the automated payment system 702. The USB hub 710 and internal power supply 712 reduce the number of connections used to interface the automated payment system 702 with the retail store system 704. For example, without the internal power supply 712 and USB hub 710, additional connection cables would be used such as a power supply cable for the banknote recycler 708, a power supply cable for the coin recycler 706, a data cable for the banknote recycler 708, a data cable for the coin recycler 706, a power supply for the coin recycler ancillary system 718, and a data cable for the coin recycler ancillary system 718. The USB hub 710 and internal power supply 712 allow for just one data/USB connection and one power connection as all other connections are made to the USB hub 710 and the internal power supply 712. The internal power supply 712 and USB hub 710 can also connect a cashless module attached with the automated payment system (not shown).

One example embodiment can include a housing including a hinge on an exterior of the housing, a door coupled to the housing via the hinge, wherein the door covers a side of the housing when in a closed position, a payment apparatus within an interior of the housing, the payment apparatus fixedly coupled to an extendable base, wherein the extendable base is slidably coupled to the housing and configured to extend out from within the housing and through the side when the door is in an open position, and a handle coupled to the door, the handle operable, when the door is in the open position, to contact the ground to provide additional support for the weight of the payment apparatus.

In one or more above examples, a rotatable surface is connected between the payment apparatus and the extendable base, the rotatable surface configured to rotate on the extendable base in order to rotate the payment apparatus.

In one or more above examples, rotating the rotatable surface provides access to components of the payment apparatus.

In one or more above examples, the extendable base is slidably coupled to the housing via slides each connected to an interior wall of the housing.

In one or more above examples, the automated payment system of claim 1, wherein the handle is configured to move between a first position and a second position.

In one or more above examples, the second position allows the handle to contact the ground when the door is in the open position.

In one or more above examples, when the door is in a closed position and when the handle moves to the first position, the handle engages a locking mechanism to lock the door.

In one or more above examples, when the door is in the closed position and when the handle moves to the second position, the handle engages the locking mechanism to unlock the door.

In one or more above examples, the handle is configured to extend in a direction perpendicular to a front surface of the door such that the handle is capable of reaching the ground when the automated payment system is positioned at different heights.

In one or more above examples, a first portion of the handle extends perpendicular to the front surface of the door telescopically from a slot in a second portion of the handle.

In one or more above examples, the door is coupled to the housing on a first side of the housing, and a payment interaction panel is coupled to a second side of the housing opposite the first side of the housing.

In one or more above examples, a third side of the housing disposed between the first side and the second side of the housing includes an aperture for providing therethrough a connection between the payment apparatus and a point-of-sale system.

In one or more above examples, the payment interaction panel includes one or more apertures each configured to receive a currency exchange interface of the payment apparatus.

In one or more above examples, the one or more apertures each receive a currency exchange interface when the extendable base and the payment apparatus are positioned within the housing.

In one or more above examples, a top surface of the housing includes an aperture disposed over a currency deposit interface of the payment apparatus when the extendable base and the payment apparatus are positioned within the housing.

In one or more above examples, the housing is installed within a point-of-sale (POS) enclosure.

In one or more above examples, the payment apparatus is operatively connected through an aperture of the housing to a POS terminal.

In one or more above examples, the automated payment system further comprises a Universal Serial Bus (USB) hub connected between the payment apparatus and the POS terminal.

In one or more above examples, the payment apparatus is a coin recycler.

In one or more above examples, the automated payments system further comprises a banknote recycler, wherein the USB hub is connected between the banknote recycler and the POS terminal.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An automated payment system, comprising:
   a housing;
   a door coupled to the housing, wherein the door covers a side of the housing when in a closed position;
   a payment apparatus within an interior of the housing, the payment apparatus coupled on an extendable base, wherein the extendable base is slidably coupled to the housing and configured to extend out, along with the payment apparatus, from within the housing and through the side when the door is in an open position; and
   a handle coupled to the door, the handle operable, when the door is in the open position, to contact a ground to provide additional support for a weight of the payment apparatus when the extendable base is extended.

2. The automated payment system of claim 1, further comprising:
   a rotatable surface connected between the payment apparatus and the extendable base, the rotatable surface configured to rotate on the extendable base in order to rotate the payment apparatus.

3. The automated payment system of claim 2, wherein rotating the rotatable surface provides access to components of the payment apparatus.

4. The automated payment system of claim 1, wherein the extendable base is slidably coupled to the housing via slides each connected to an interior wall of the housing.

5. The automated payment system of claim 1, wherein the handle is configured to move between a first position and a second position.

6. The automated payment system of claim 5, wherein the second position allows the handle to contact the ground when the door is in the open position.

7. The automated payment system of claim 5, wherein, when the door is in the closed position and when the handle moves to the first position, the handle engages a locking mechanism to lock the door.

8. The automated payment system of claim 7, wherein, when the door is in the closed position and when the handle moves to the second position, the handle engages the locking mechanism to unlock the door.

9. The automated payment system of claim 1, wherein the handle is configured to extend in a direction perpendicular to a front surface of the door such that the handle is capable of reaching the ground when the automated payment system is positioned at different heights.

10. The automated payment system of claim 9, wherein a first portion of the handle extends perpendicular to the front surface of the door telescopically from a slot in a second portion of the handle.

11. The automated payment system of claim 1, wherein the door is coupled to the housing on a first side of the housing, and further comprising:
a payment interaction panel coupled to a second side of the housing opposite the first side of the housing.

12. The automated payment system of claim 11, wherein a third side of the housing disposed between the first side and the second side of the housing includes an aperture for providing therethrough a connection between the payment apparatus and a point-of-sale system.

13. The automated payment system of claim 11, wherein the payment interaction panel includes one or more apertures each configured to receive a currency exchange interface of the payment apparatus.

14. The automated payment system of claim 13, wherein the one or more apertures each receive a currency exchange interface when the extendable base and the payment apparatus are positioned within the housing.

15. The automated payment system of claim 14, wherein a top surface of the housing includes an aperture disposed over a currency deposit interface of the payment apparatus when the extendable base and the payment apparatus are positioned within the housing.

16. The automated payment system of claim 1, wherein the housing is installed within a point-of-sale (POS) enclosure.

17. The automated payment system of claim 16, wherein the payment apparatus is operatively connected through an aperture of the housing to a POS terminal.

18. The automated payment system of claim 17, further comprising a Universal Serial Bus (USB) hub connected between the payment apparatus and the POS terminal.

19. The automated payment system of claim 18, wherein the payment apparatus is a coin recycler.

20. The automated payments system of claim 19, further comprising a banknote recycler, wherein the USB hub is connected between the banknote recycler and the POS terminal.

* * * * *